(12) United States Patent
Shimazawa et al.

(10) Patent No.: US 8,391,106 B2
(45) Date of Patent: Mar. 5, 2013

(54) HEAT-ASSISTED MAGNETIC RECORDING HEAD WITH LASER DIODE

(75) Inventors: Koji Shimazawa, Tokyo (JP); Yasuhiro Ito, Tokyo (JP); Yuji Kakinuma, Tokyo (JP); Daisuke Miyauchi, Tokyo (JP); Kosuke Tanaka, Tokyo (JP)

(73) Assignee: TDK Corporation, Tokyo (JP)

( * ) Notice: Subject to any disclaimer, the term of this patent is extended or adjusted under 35 U.S.C. 154(b) by 884 days.

(21) Appl. No.: 12/461,157

(22) Filed: Aug. 3, 2009

(65) Prior Publication Data

US 2011/0026156 A1 Feb. 3, 2011

(51) Int. Cl.
*G11B 11/00* (2006.01)
(52) U.S. Cl. .................................... 369/13.03
(58) Field of Classification Search ............... None
See application file for complete search history.

(56) References Cited

U.S. PATENT DOCUMENTS

| | | | | |
|---|---|---|---|---|
| 6,404,706 B1 * | 6/2002 | Stovall et al. | | 369/13.17 |
| 7,330,404 B2 | 2/2008 | Peng et al. | | |
| 2003/0231674 A1 * | 12/2003 | Kaneko et al. | | 372/36 |
| 2008/0002298 A1 | 1/2008 | Sluzewski | | |
| 2008/0043360 A1 | 2/2008 | Shimazawa et al. | | |
| 2008/0218891 A1 * | 9/2008 | Gubbins et al. | | 360/59 |
| 2008/0298745 A1 * | 12/2008 | Hamasaki et al. | | 385/39 |
| 2010/0118664 A1 * | 5/2010 | Nishida et al. | | 369/13.33 |
| 2011/0013497 A1 * | 1/2011 | Sasaki et al. | | 369/13.24 |

FOREIGN PATENT DOCUMENTS

JP   A-2007-200475   8/2007

* cited by examiner

*Primary Examiner* — Adam R Giesy
*Assistant Examiner* — Henok Heyi
(74) *Attorney, Agent, or Firm* — Oliff & Berridge, PLC

(57) ABSTRACT

A heat-assisted magnetic recording head includes a slider, and an edge-emitting laser diode that emits polarized light of TM mode. The laser diode is arranged so that its bottom surface faces the top surface of the slider. An electrode of the laser diode closer to the active layer is bonded to a conductive layer of the slider, whereby the laser diode is fixed to the slider. As viewed from above the laser diode, the bottom surface of the electrode of the laser diode includes a first area that a light propagation path of the laser diode overlies, and a second area other than the first area. The top surface of the conductive layer is in contact not with the first area but with the second area of the bottom surface of the electrode.

16 Claims, 14 Drawing Sheets

HEAT-ASSISTED MAGNETIC RECORDING HEAD WITH LASER DIODE

BACKGROUND OF THE INVENTION

1. Field of the Invention

The present invention relates to a heat-assisted magnetic recording head for use in heat-assisted magnetic recording where a magnetic recording medium is irradiated with near-field light to lower the coercivity of the magnetic recording medium for data recording, a method of manufacturing the same, and a head gimbal assembly and a magnetic recording device each of which includes the heat-assisted magnetic recording head.

2. Description of the Related Art

Recently, magnetic recording devices such as a magnetic disk drive have been improved in recording density, and thin-film magnetic heads and magnetic recording media of improved performance have been demanded accordingly. Among the thin-film magnetic heads, a composite thin-film magnetic head has been used widely. The composite thin-film magnetic head has such a structure that a reproducing head including a magnetoresistive element (hereinafter, also referred to as MR element) intended for reading and a recording head including an induction-type electromagnetic transducer intended for writing are stacked on a substrate. In a magnetic disk drive, the thin-film magnetic head is mounted on a slider that flies slightly above the surface of the magnetic recording medium.

Magnetic recording media are discrete media each made of an aggregate of magnetic fine particles, each magnetic fine particle forming a single-domain structure. A single recording bit of a magnetic recording medium is composed of a plurality of magnetic fine particles. For improved recording density, it is necessary to reduce asperities at the borders between adjoining recording bits. To achieve this, the magnetic fine particles must be made smaller. However, making the magnetic fine particles smaller causes the problem that the thermal stability of magnetization of the magnetic fine particles decreases with decreasing volume of the magnetic fine particles. To solve this problem, it is effective to increase the anisotropic energy of the magnetic fine particles. However, increasing the anisotropic energy of the magnetic fine particles leads to an increase in coercivity of the magnetic recording medium, and this makes it difficult to perform data recording with existing magnetic heads.

To solve the foregoing problems, there has been proposed a technique so-called heat-assisted magnetic recording. This technique uses a magnetic recording medium having high coercivity. When recording data, a magnetic field and heat are simultaneously applied to the area of the magnetic recording medium where to record data, so that the area rises in temperature and drops in coercivity for data recording. Hereinafter, a magnetic head for use in heat-assisted magnetic recording will be referred to as a heat-assisted magnetic recording head.

In heat-assisted magnetic recording, near-field light is typically used as a means for applying heat to the magnetic recording medium. A commonly known method for generating near-field light is to use a near-field optical probe or so-called plasmon antenna, which is a piece of metal that generates near-field light from plasmons excited by irradiation with light.

However, a plasmon antenna that is directly irradiated with light to generate near-field light is known to exhibit very low efficiency of conversion of the applied light into near-field light. The energy of the light applied to the plasmon antenna is mostly reflected off the surface of the plasmon antenna, or converted into thermal energy and absorbed by the plasmon antenna. The plasmon antenna is small in volume since the size of the plasmon antenna is set to be smaller than or equal to the wavelength of the light. The plasmon antenna therefore shows a significant increase in temperature when it absorbs the thermal energy.

Such a temperature increase makes the plasmon antenna expand in volume and protrude from a medium facing surface, which is the surface of the heat-assisted magnetic recording head to face the magnetic recording medium. This causes an end of the reproducing head located in the medium facing surface to get farther from the magnetic recording medium, thereby causing the problem that a servo signal cannot be read during recording operations.

To cope with this, as described in, for example, U.S. Pat. No. 7,330,404, there has been proposed a technique in which light propagating through a waveguide is not directly applied to a plasmon antenna but is coupled with a near-field light generating element via a buffer layer in a surface plasmon polariton mode to thereby excite surface plasmons on the near field light generating element. The near-field light generating element has a near-field light generating part that is located in the medium facing surface and generates near-field light. According to this technique, the light propagating through the waveguide is totally reflected at the interface between the waveguide and the buffer layer to generate evanescent light permeating into the buffer layer. The evanescent light and collective oscillations of charges on the near-field light generating element, i.e., surface plasmons, are coupled with each other to excite the surface plasmons on the near-field light generating element. In the near-field light generating element, the excited surface plasmons propagate to the near-field light generating part, and near-field light occurs from the near-field light generating part. According to this technique, since the near-field light generating element is not directly irradiated with the light propagating through the waveguide, it is possible to prevent an excessive increase in temperature of the near-field light generating element.

In a near-field light generating device including the waveguide, the buffer layer and the near-field light generating element, a possible layout of the waveguide, the buffer layer and the near-field light generating element is such that the near-field light generating element is opposed to the top or bottom surface of the waveguide with the buffer layer interposed therebetween in the vicinity of the medium facing surface. The waveguide allows propagation of laser light to be used for generating near-field light. In order to generate surface plasmons of high intensity on the near-field light generating element, the foregoing layout requires that the laser light to propagate through the waveguide be TM-polarized light whose electric field oscillates in a direction perpendicular to the top and bottom surfaces of the waveguide.

Possible techniques of placement of a light source that emits the laser light to propagate through the waveguide are broadly classified into the following two. A first technique is to place the light source away from the slider. A second technique is to fix the light source to the slider.

The first technique is described in JP 2007-200475 A, for example. The second technique is described in U.S. Patent Application Publication No. 2008/0002298 A1 and U.S. Patent Application Publication No. 2008/0043360 A1, for example.

The first technique requires an optical path of extended length including such optical elements as a mirror, lens, and optical fiber in order to guide the light from the light source to the waveguide. This causes the problem of increasing energy loss of the light in the path. The second technique is free from the foregoing problem since the optical path for guiding the light from the light source to the waveguide is short.

The second technique, however, has the following problem. Hereinafter, the problem that can occur with the second technique will be described in detail. The second technique typically uses a laser diode as the light source. The laser diodes available include edge-emitting laser diodes and surface-emitting laser diodes. In an edge-emitting laser diode, the emission part for emitting the laser light is located in an end face that lies at an end of the laser diode in a direction parallel to the plane of an active layer. The emission part emits the laser light in the direction parallel to the plane of the active layer. In a surface-emitting laser diode, the emission part for emitting the laser light is located in a surface that lies at an end of the laser diode in a direction perpendicular to the plane of the active layer. The emission part emits the laser light in the direction perpendicular to the plane of the active layer.

The laser light emitted from a laser diode can be made incident on the waveguide by a technique described in U.S. Patent Application Publication No. 2008/0002298 A1, for example. This publication describes arranging a surface-emitting laser diode with its emission part opposed to the surface of the slider on the trailing side so that the laser light emitted from the emission part is incident on the waveguide from above. Surface-emitting laser diodes, however, typically have a lower optical output as compared with edge-emitting laser diodes. The technique therefore has the problem that it is difficult to provide laser light of sufficiently high intensity for use in generating near-field light.

The laser light emitted from a laser diode may be made incident on the waveguide by other techniques. For example, U.S. Patent Application Publication No. 2008/0043360 A1 describes a technique in which the incident end face of the waveguide is arranged at the surface opposite to the medium facing surface of the slider, and the laser diode is arranged with its emission part opposed to this incident end face so that the laser light emitted from the emission part is incident on the incident end face of the waveguide without the intervention of any optical element. This technique allows the use of an edge-emitting laser diode which has a high optical output. However, this technique has the problem that it is difficult to align the emission part of the laser diode with respect to the incident end face of the waveguide with high precision, since the position of the emission part of the laser diode can vary within a plane perpendicular to the optical axis of the waveguide.

To cope with this, the edge-emitting laser diode may be fixed to the top surface of the slider that lies at an end of the slider above the top surface of the substrate, so that the laser light is emitted in a direction parallel to the top surface of the slider, while arranging the waveguide so that the incident end face of the waveguide is opposed to the emission part of the laser diode.

An edge-emitting laser diode typically includes: an n-substrate having two surfaces that face toward mutually opposite directions; an n-electrode bonded to one of the two surfaces of the n-substrate; a laser structure part integrated on the other of the two surfaces of the n-substrate; and a p-electrode bonded to the laser structure part such that the laser structure part is sandwiched between the n-substrate and the p-electrode. The laser structure part includes the active layer. The edge-emitting laser diode has two surfaces that lie at opposite ends in the direction perpendicular to the plane of the active layer; one is formed by the surface of the n-electrode, and the other is formed by the surface of the p-electrode. The distance between the surface of the p-electrode and the active layer is smaller than the distance between the surface of the n-electrode and the active layer. When the edge-emitting laser diode is fixed to the top surface of the slider as mentioned above, the laser diode is preferably arranged so that the surface of the p-electrode closer to the active layer faces the top surface of the slider, rather than so that the surface of the n-electrode faces the top surface of the slider. The reason is that the former arrangement can reduce the difference in level between the bottom surface of the laser diode and the position of the incident end face of the waveguide. One of possible methods for fixing the edge-emitting laser diode to the slider so that the surface of the p-electrode faces the top surface of the slider is to solder-bond the p-electrode of the laser diode to a conductive layer that is disposed on the top surface of the slider.

Now, let us consider a configuration in which the edge-emitting laser diode is fixed to the slider so that the surface of the p-electrode faces the top surface of the slider, and the waveguide is arranged so that the incident end face of the waveguide is opposed to the emission part of the laser diode as described above. Here, suppose also that the near-field light generating element is arranged in the vicinity of the medium facing surface so that the near-field light generating element is opposed to the top surface or the bottom surface of the waveguide with the buffer layer interposed therebetween, as mentioned previously. This configuration requires that the laser light to propagate through the waveguide be TM-polarized light as mentioned previously. It is therefore necessary to use an edge-emitting laser diode that emits polarized light of TM mode whose electric field oscillates in the direction perpendicular to the plane of the active layer. Such a configuration has the following problem.

A laser diode that emits polarized light of TM mode is typically achieved by a strained quantum well structure in which the active layer is given a tensile strain. In the case of the laser diode that emits polarized light of TM mode, the state of polarization of the emitted light changes more sensitively in response to the stress on the active layer than in the case of a laser diode that emits polarized light of TE mode whose electric field oscillates in the direction parallel to the plane of the active layer. Consequently, if the p-electrode of the laser diode that emits polarized light of TM mode is solder-bonded to the conductive layer disposed on the top surface of the slider, a stress occurring from the solidification of the solder may act on the active layer located near the p-electrode to change the state of polarization of the emitted light.

OBJECT AND SUMMARY OF THE INVENTION

It is an object of the present invention to provide a heat-assisted magnetic recording head including an edge-emitting laser diode that emits polarized light of TM mode, wherein the laser diode is arranged with its bottom surface toward the top surface of the slider and is fixed to the slider by bonding an electrode of the laser diode to a conductive layer of the slider, the heat-assisted magnetic recording head being capable of suppressing changes in the state of polarization of light emitted from the laser diode, and to provide a manufacturing method for the heat-assisted magnetic recording head, and a head gimbal assembly and a magnetic recording device each of which includes the heat-assisted magnetic recording head.

A heat-assisted magnetic recording head according to the present invention includes a slider, and an edge-emitting laser diode fixed to the slider. The slider includes: a medium facing surface that faces a magnetic recording medium; a magnetic pole that has an end face located in the medium facing surface and produces a recording magnetic field for recording data on the magnetic recording medium; a waveguide that allows light to propagate therethrough; a near-field light generating element that generates near-field light; and a substrate on which the magnetic pole, the near-field light generating element and the waveguide are stacked. The substrate has a top surface facing toward the magnetic pole, the near-field light generating element and the waveguide. The slider has a top surface that lies at an end above the top surface of the substrate.

The laser diode includes: an active layer; an emitting end face that lies at an end in a direction parallel to a plane of the active layer and includes an emission part for emitting laser light; a light propagation path that includes a part of the active layer and extends in a direction perpendicular to the emitting end face; a bottom surface and a top surface that lie at opposite ends in a direction perpendicular to the plane of the active layer; and an electrode having a bottom surface that constitutes at least a part of the bottom surface of the laser diode. The laser diode is arranged so that the bottom surface of the laser diode faces the top surface of the slider. The light propagation path has a width smaller than that of the laser diode in a direction parallel to the emitting end face and the plane of the active layer. A distance between the bottom surface of the laser diode and the active layer is smaller than that between the top surface of the laser diode and the active layer. The laser light emitted from the emission part is polarized light of TM mode whose electric field oscillates in the direction perpendicular to the plane of the active layer.

The waveguide has an outer surface. The outer surface includes an incident end face that is opposed to the emission part of the laser diode. The near-field light generating element has a near-field light generating part that is located in the medium facing surface, and a coupling part that is opposed to the outer surface of the waveguide. A surface plasmon is excited on the coupling part based on the light propagating through the waveguide. The surface plasmon propagates to the near-field light generating part, and the near-field light generating part generates near-field light based on the surface plasmon.

The slider further includes a conductive layer having a top surface that constitutes a part of the top surface of the slider. The electrode of the laser diode is bonded to the conductive layer of the slider. As viewed from above the laser diode, the bottom surface of the electrode of the laser diode includes a first area that the light propagation path overlies, and a second area other than the first area. The top surface of the conductive layer is in contact not with the first area but with the second area of the bottom surface of the electrode. Consequently, according to the present invention, it is possible to prevent a stress resulting from the bonding between the electrode of the laser diode and the conductive layer of the slider from acting on the light propagation path.

A manufacturing method for the heat-assisted magnetic recording head according to the present invention includes the steps of fabricating the slider; and fixing the laser diode to the slider. In the step of fixing the laser diode to the slider, the electrode of the laser diode is bonded to the conductive layer of the slider by ultrasonic bonding wherein ultrasonic vibrations are applied to the laser diode in the direction perpendicular to the emitting end face, with the second area of the bottom surface of the electrode in contact with the top surface of the conductive layer. According to the present invention, it is possible to reduce the stress that results from the bonding between the electrode of the laser diode and the conductive layer of the slider, as compared with the case where the electrode is bonded to the conductive layer by soldering. In this respect also, the present invention makes it possible to prevent the stress resulting from the bonding between the electrode of the laser diode and the conductive layer of the slider from acting on the light propagation path. Furthermore, according to the present invention, since ultrasonic vibrations are applied to the laser diode in the direction perpendicular to the emitting end face in ultrasonic bonding, it is possible to prevent the emission part of the laser diode from being misaligned with respect to the incident end face of the waveguide in a direction parallel to the emitting end face.

In the heat-assisted magnetic recording head or the manufacturing method for the same according to the present invention, the second area may include two portions that sandwich the first area therebetween. The top surface of the conductive layer may include a first contact surface and a second contact surface that make contact with the two portions of the second area. In this case, the conductive layer may have a first portion having the first contact surface and a second portion having the second contact surface, the first and second portions being separated from each other. Alternatively, the slider may include an insulating layer disposed under the conductive layer. The insulating layer may have a top surface, and the top surface of the insulating layer may have a recess that is opposed to the first area of the bottom surface of the electrode. In this case, the conductive layer may include a portion that is recessed along the recess of the top surface of the insulating layer so as not to make contact with the first area.

In the heat-assisted magnetic recording head or the manufacturing method for the same according to the present invention, the slider may further include a buffer layer that has a refractive index lower than that of the waveguide and is interposed between the coupling part and the outer surface of the waveguide. In this case, a surface plasmon is excited on the coupling part through coupling with evanescent light that occurs from the interface between the waveguide and the buffer layer.

In the heat-assisted magnetic recording head or the manufacturing method for the same according to the present invention, each of the electrode and the conductive layer may be made of a metal that contains Au as a main component. As employed herein, "a main component" refers to a component that occupies 50 atomic % or more of the whole.

In the heat-assisted magnetic recording head or the manufacturing method for the same according to the present invention, the emitting end face of the laser diode may be positioned to leave a gap from the incident end face of the waveguide.

A head gimbal assembly according to the present invention includes: the heat-assisted magnetic recording head according to the present invention; and a suspension that supports the heat-assisted magnetic recording head. A magnetic recording device according to the present invention includes: a magnetic recording medium; the heat-assisted magnetic recording head according to the present invention; and a positioning device that supports the heat-assisted magnetic recording head and positions the same with respect to the magnetic recording medium.

In the heat-assisted magnetic recording head, the head gimbal assembly or the magnetic recording device of the present invention, the edge-emitting laser diode that emits polarized light of TM mode is arranged so that its bottom surface faces the top surface of the slider, and the laser diode is fixed to the slider by bonding the electrode of the laser diode to the conductive layer of the slider. In the present invention, as viewed from above the laser diode, the bottom surface of the electrode of the laser diode includes the first area that the light propagation path of the laser diode overlies, and the second area other than the first area. The top surface of the conductive layer is in contact not with the first area but with the second area of the bottom surface of the electrode. According to the present invention, it is thus possible to prevent a stress resulting from the bonding between the electrode of the laser diode and the conductive layer of the slider from acting on the light propagation path. Consequently, the present invention makes it possible to suppress changes in the state of polarization of the light emitted from the laser diode.

In the manufacturing method for the heat-assisted magnetic recording head of the present invention, the electrode of the laser diode is bonded to the conductive layer of the slider by ultrasonic bonding wherein ultrasonic vibrations are applied to the laser diode in the direction perpendicular to the emitting end face, with the second area of the bottom surface of the electrode in contact with the top surface of the conductive layer. In addition to providing the foregoing effects of the heat-assisted magnetic recording head, the manufacturing method of the present invention thus makes it possible to prevent the emission part of the laser diode from being misaligned with respect the incident end face of the waveguide in a direction parallel to the emitting end face. Consequently, according to the present invention, it is possible to prevent a drop in intensity of the laser light to be used for generating near-field light.

Other and further objects, features and advantages of the present invention will appear more fully from the following description.

DETAILED DESCRIPTION OF THE PREFERRED EMBODIMENTS

First Embodiment

Figure 8:
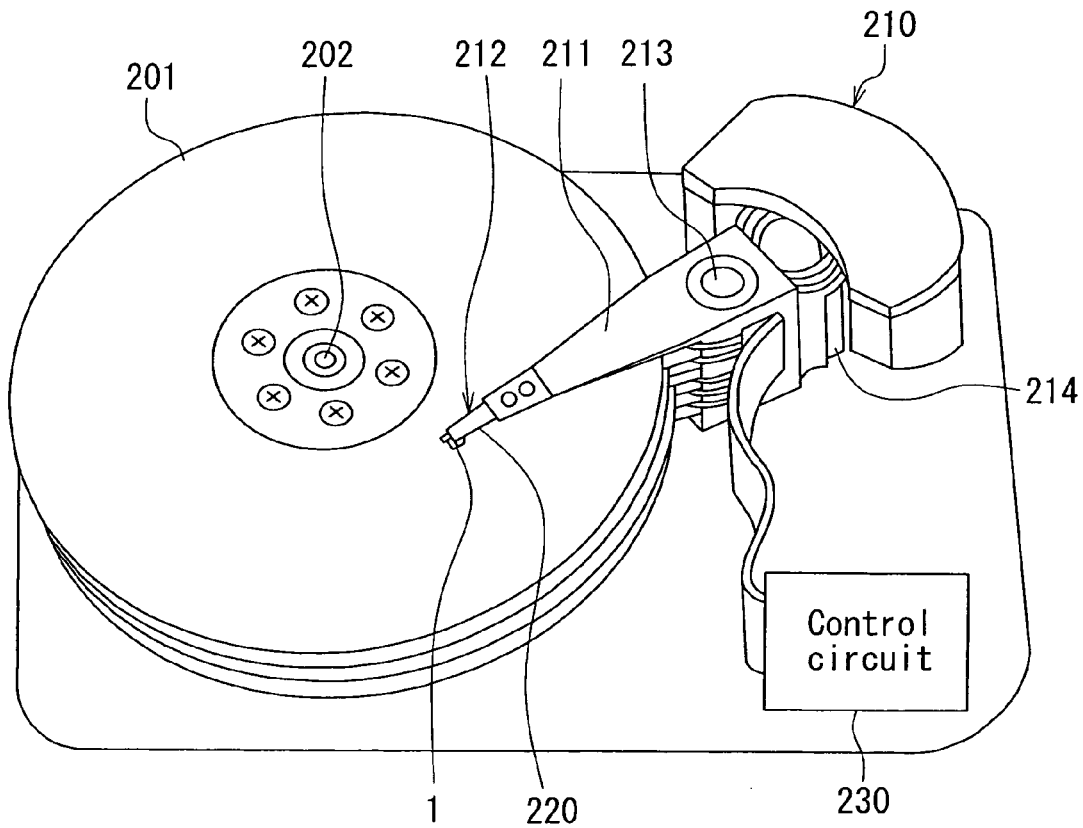
FIG. 8 is a perspective view showing a magnetic recording device according to the first embodiment of the invention.

Preferred embodiments of the present invention will now be described in detail with reference to the drawings. Reference is first made to FIG. 8 to describe a magnetic disk drive as a magnetic recording device according to a first embodiment of the invention. As shown in FIG. 8, the magnetic disk drive includes a plurality of magnetic disks 201 as a plurality of magnetic recording media, and a spindle motor 202 for rotating the plurality of magnetic disks 201. The magnetic disks 201 of the present embodiment are for use in perpendicular magnetic recording. Each magnetic disk 201 has such a structure that a soft magnetic backing layer, a middle layer and a magnetic recording layer (perpendicular magnetization layer) are stacked in this order on a disk substrate.

The magnetic disk drive further includes an assembly carriage device 210 having a plurality of driving arms 211, and a plurality of head gimbal assemblies 212 attached to respective distal ends of the driving arms 211. Each head gimbal assembly 212 includes a heat-assisted magnetic recording head 1 according to the present embodiment, and a suspension 220 that supports the heat-assisted magnetic recording head 1.

The assembly carriage device 210 is a device for positioning each heat-assisted magnetic recording head 1 on tracks that are formed in the magnetic recording layer of each magnetic disk 201 and that have recording bits aligned thereon. The assembly carriage device 210 further has a pivot bearing shaft 213 and a voice coil motor 214. The plurality of driving arms 211 are stacked in a direction along the pivot bearing shaft 213 and are pivotable about the shaft 213 by being driven by the voice coil motor 214. The magnetic recording device according to the present invention is not structurally limited to the magnetic disk drive having the above-described configuration. For example, the magnetic recording device according to the present invention may be provided with a single magnetic disk 201, a single driving arm 211, a single head gimbal assembly 212 and a single heat-assisted magnetic recording head 1.

The magnetic disk drive further includes a control circuit 230 for controlling the recording and reproducing operations of the heat-assisted magnetic recording heads 1 and also for controlling the light emitting operation of a laser diode serving as a light source for generating laser light for heat-assisted magnetic recording described later.

Figure 9:
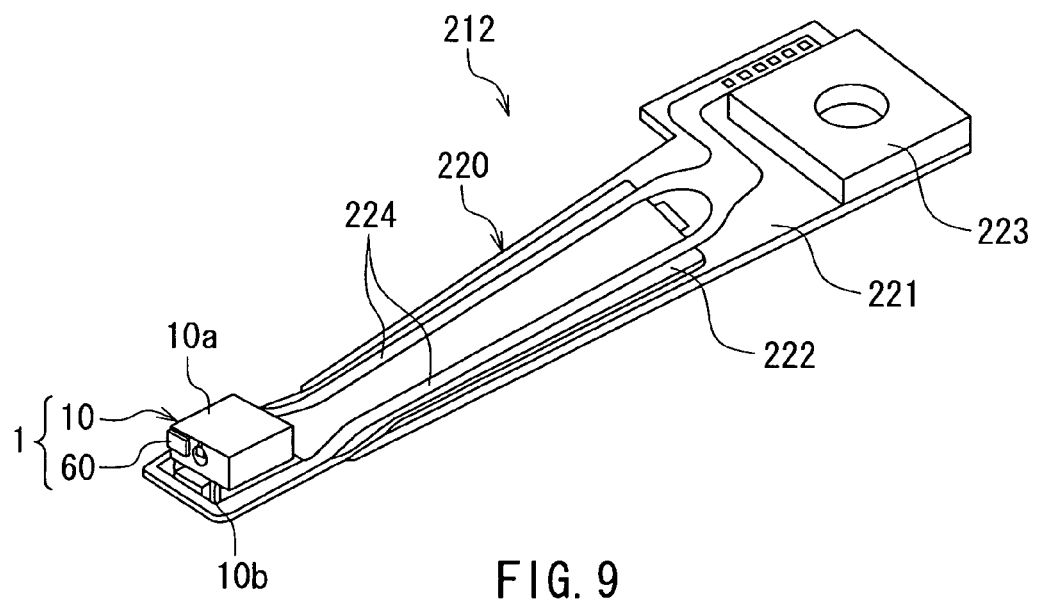
FIG. 9 is a perspective view showing a head gimbal assembly according to the first embodiment of the invention.

FIG. 9 is a perspective view of the head gimbal assembly 212 of FIG. 8. As previously described, the head gimbal assembly 212 includes the heat-assisted magnetic recording head 1 and the suspension 220. The suspension 220 has a load beam 221, a flexure 222 fixed to the load beam 221 and having flexibility, a base plate 223 provided at the base part of the load beam 221, and a wiring member 224 provided on the load beam 221 and the flexure 222. The wiring member 224 includes a plurality of leads. The heat-assisted magnetic recording head 1 is fixed to the flexure 222 at the distal end of the suspension 220 such that the head 1 faces the surface of the magnetic disk 201 with a predetermined spacing (flying height). One end of the wiring member 224 is electrically connected to a plurality of terminals of the heat-assisted magnetic recording head 1. The other end of the wiring member 224 is provided with a plurality of pad-shaped terminals arranged at the base part of the load beam 221.

The assembly carriage device 210 and the suspension 220 correspond to the positioning device according to the present invention. The head gimbal assembly according to the present invention is not limited to the one having the configuration shown in FIG. 9. For example, the head gimbal assembly according to the present invention may have an IC chip for driving the head that is mounted somewhere along the suspension 220.

The heat-assisted magnetic recording head 1 according to the present embodiment will now be described in detail. As shown in FIG. 9, the heat-assisted magnetic recording head 1 includes a slider 10, and an edge-emitting laser diode 60 fixed to the slider 10. The slider 10 is nearly hexahedron-shaped, and has a medium facing surface 10$a$ that faces the magnetic recording medium, a rear surface 10$b$ opposite to the medium facing surface 10$a$, and four surfaces that connect the medium facing surface 10$a$ to the rear surface 10$b$.

Figure 3:
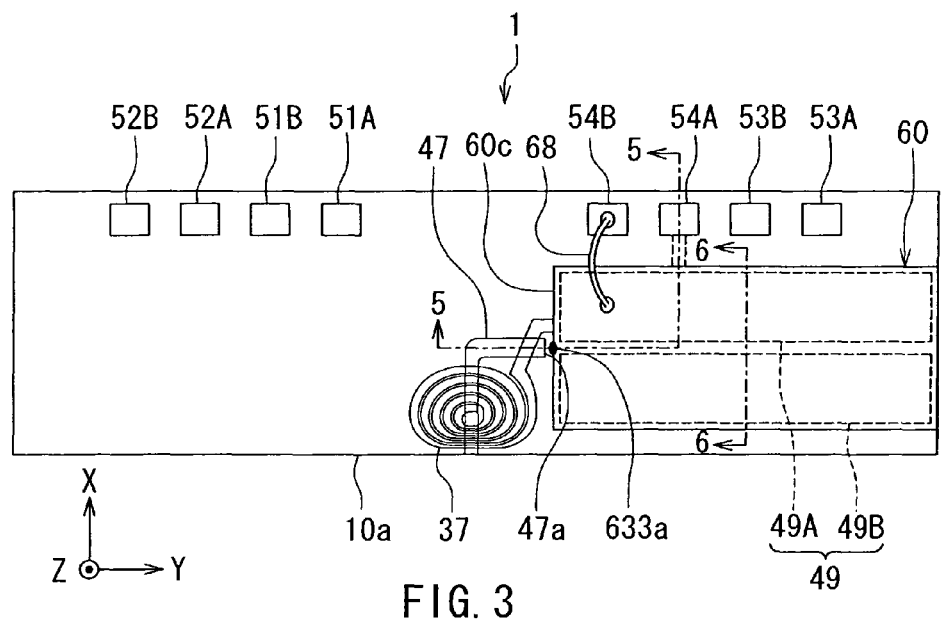
FIG. 3 is an explanatory diagram showing the layout of the main part of the heat-assisted magnetic recording head according to the first embodiment of the invention.
Figure 4:
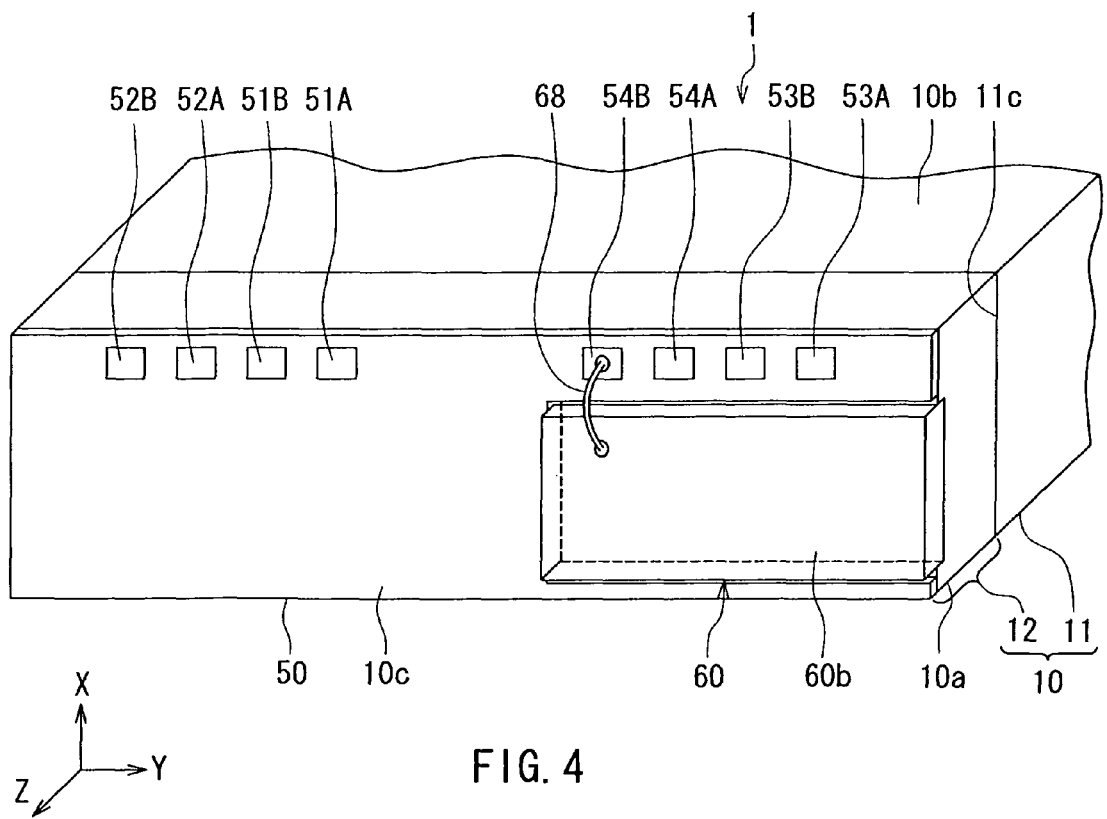
FIG. 4 is a perspective view of the main part of the heat-assisted magnetic recording head according to the first embodiment of the invention.
Figure 5:
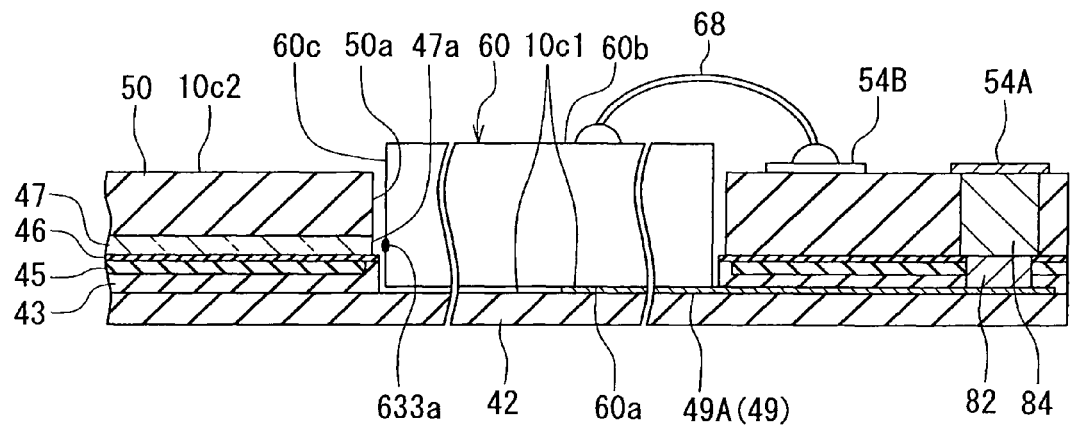
FIG. 5 is a cross-sectional view showing a part of the heat-assisted magnetic recording head taken along line 5-5 of FIG. 3.
Figure 6:
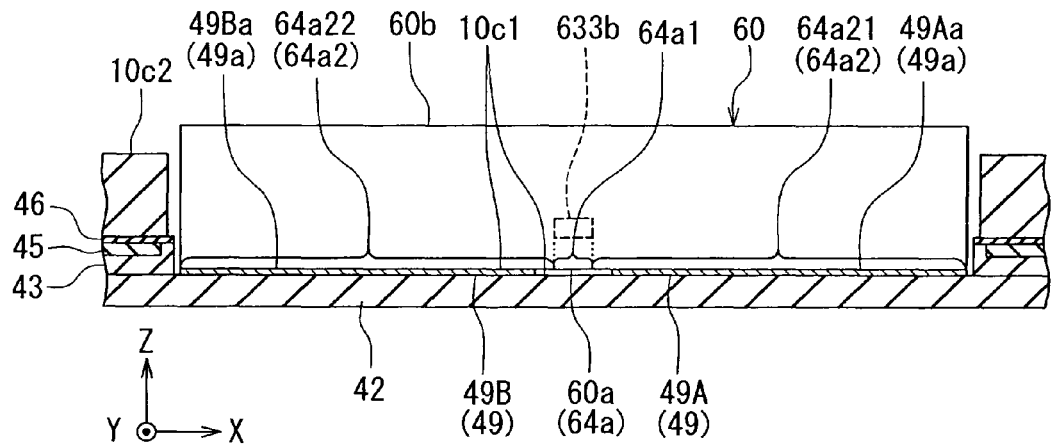
FIG. 6 is a cross-sectional view showing a part of the heat-assisted magnetic recording head taken along line 6-6 of FIG. 3.

FIG. 3 is an explanatory diagram showing the layout of the main part of the heat-assisted magnetic recording head 1. FIG. 4 is a perspective view of the main part of the heat-assisted magnetic recording head 1. FIG. 5 is a cross-sectional view showing a part of the heat-assisted magnetic recording head 1 taken along line 5-5 of FIG. 3. FIG. 6 is a cross-sectional view showing a part of the heat-assisted magnetic recording head 1 taken along line 6-6 of FIG. 3.

As shown in FIG. 4, the slider 10 includes a substrate 11 and a head unit 12. The substrate 11 is rectangular-solid-shaped and is made of a ceramic material such as aluminum oxide-titanium carbide ($Al_2O_3$—TiC). The substrate 11 has a top surface 11$c$. The top surface 11$c$ is perpendicular to the medium facing surface 10$a$. The head unit 12 is integrated on the top surface 11$c$ of the substrate 11. The medium facing surface 10$a$ is processed so as to obtain an appropriate flying height of the slider 10 with respect to the magnetic disk 201. The slider 10 has a top surface 10$c$ that lies at an end above the top surface 11$c$ of the substrate 11. The top surface 10$c$ is one of the four surfaces of the slider 10 that connect the medium facing surface 10$a$ to the rear surface 10$b$. FIG. 4 shows the heat-assisted magnetic recording head 1 placed so that the top surface 10$c$ faces toward the viewer. In FIG. 3, some of the components of the head unit 12 located at levels lower than the top surface 10$c$ are drawn in solid lines for the sake of convenience.

Where the components of the head unit 12 and the laser diode 60 are concerned, with respect to a reference position, a position located in a direction that is perpendicular to the top surface 11$c$ of the substrate 11 and gets away from the top surface 11$c$ is defined as "above", whereas a position located in a direction opposite to the foregoing direction is defined as "below". Where the components of the head unit 12 and the laser diode 60 are concerned, the surface closer to the top surface 11$c$ is defined as a "bottom surface," and the surface farther from the top surface 11$c$ as a "top surface".

Moreover, X direction, Y direction, Z direction, −X direction, −Y direction and −Z direction will be defined as follows. The X direction is a direction perpendicular to the medium facing surface 10$a$ and heading from the medium facing surface 10$a$ toward the rear surface 10$b$. The Y direction is a direction parallel to the medium facing surface 10$a$ and the top surface 11$c$ of the substrate 11 and heading toward the right in FIG. 4. The Z direction is a direction perpendicular to the top surface 11$c$ of the substrate 11 and getting away from the top surface 11$c$. The −X direction, the −Y direction and the −Z direction are opposite to the X direction, the Y direction and the Z direction, respectively. As viewed from the slider 10, the magnetic disk 201 moves in the Z direction. The slider 10 has an air inflow end (a leading end) at the end of the medium facing surface 10$a$ in the −Z direction. The slider 10 has an air outflow end (a trailing end) at the end of the medium facing surface 10$a$ in the Z direction. A track width direction is a direction parallel to the Y direction.

As shown in FIG. 4, the head unit 12 includes an overcoat layer 50 which is an uppermost layer of the head unit 12. The overcoat layer 50 is provided to cover a part of the top surface of the head unit 12 excluding the overcoat layer 50. Thus, as shown in FIG. 5 and FIG. 6, the top surface 10$c$ of the slider 10 has a first portion 10$c$1 that is not covered with the overcoat layer 50, and a second portion 10$c$2 that is formed by the top surface of the overcoat layer 50. The second portion 10$c$2 is located farther from the top surface 11$c$ of the substrate 11 than is the first portion 10$c$1. The laser diode 60 is disposed on the first portion 10$c$1.

The head unit 12 further includes a plurality of pad-shaped terminals arranged on the top surface of the overcoat layer 50. FIG. 3 and FIG. 4 show an example in which the head unit 12 has eight terminals 51A, 51B, 52A, 52B, 53A, 53B, 54A, and 54B. For the sake of convenience, FIG. 5 shows the terminal 54B in a position different from the actual position.

Figure 10:
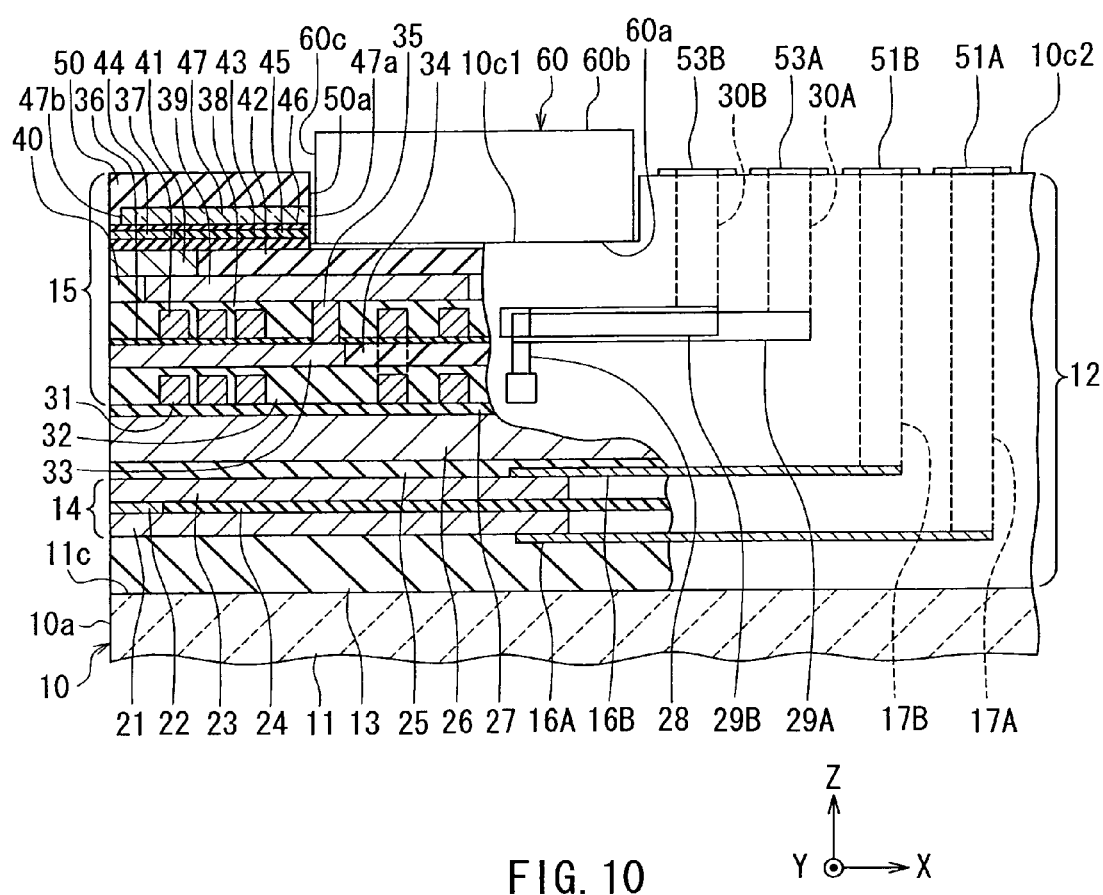
FIG. 10 is an explanatory diagram showing the general configuration of the heat-assisted magnetic recording head according to the first embodiment of the invention.

FIG. 10 is an explanatory diagram showing the general configuration of the heat-assisted magnetic recording head 1. For the sake of convenience, FIG. 10 shows some of the components of the head unit 12 in shapes and layout different from those in the actual configuration. The X, Y, and Z directions shown in FIG. 10 apply only to the vicinity of the medium facing surface 10$a$.

As shown in FIG. 10, the head unit 12 includes an insulating layer 13 disposed on the top surface 11$c$ of the substrate 11, and a reproducing head 14 and a recording head 15 that are stacked on the insulating layer 13 in this order. The insulating layer 13 is made of an insulating material such as $Al_2O_3$ (hereinafter, also referred to as alumina).

The reproducing head 14 includes: a lower shield layer 21 disposed on the insulating layer 13; an MR element 22 disposed on the lower shield layer 21; an upper shield layer 23 disposed on the MR element 22; and an insulating layer 24 disposed around the MR element 22 between the lower shield layer 21 and the upper shield layer 23. The lower shield layer 21 and the upper shield layer 23 are each made of a soft magnetic material. The insulating layer 24 is made of an insulating material such as alumina.

An end of the MR element 22 is located in the medium facing surface 10a. The MR element may be a giant magnetoresistive (GMR) element or a tunneling magnetoresistive (TMR) element, for example. The GMR element may be of either the current-in-plane (CIP) type in which a sense current for magnetic signal detection is fed in a direction nearly parallel to the plane of layers constituting the GMR element or the current-perpendicular-to-plane (CPP) type in which the sense current is fed in a direction nearly perpendicular to the plane of layers constituting the GMR element.

If the MR element 22 is a TMR element or a CPP-type GMR element, the lower shield layer 21 and the upper shield layer 23 may also function as electrodes for feeding the sense current to the MR element 22. FIG. 10 shows an example in which the MR element 22 is a TMR element or a CPP-type GMR element. In this example, the head unit 12 further includes: a wiring layer 16A having an end electrically connected to the lower shield layer 21; a wiring layer 16B having an end electrically connected to the upper shield layer 23; a connecting part 17A that electrically connects the other end of the wiring layer 16A to the terminal 51A; and a connecting part 17B that electrically connects the other end of the wiring layer 16B to the terminal 51B. The wiring layers 16A and 16B and the connecting parts 17A and 17B are each made of a conductive material such as Cu. Each of the connecting parts 17A and 17B is formed by stacking a plurality of conductor layers of columnar shape.

If the MR element 22 is a CIP-type GMR element, insulating films are respectively provided between the MR element 22 and the lower shield layer 21 and between the MR element 22 and the upper shield layer 23, and two wiring layers for feeding the sense current to the MR element 22 are provided between these insulating films.

The head unit 12 further includes: an insulating layer 25 disposed on the upper shield layer 23; a middle shield layer 26 disposed on the insulating layer 25; and an insulating layer 27 disposed on the middle shield layer 26. The middle shield layer 26 has the function of shielding the MR element 22 from a magnetic field produced in the recording head 15. The insulating layers 25 and 27 are each made of an insulating material such as alumina. The middle shield layer 26 is made of a soft magnetic material. The insulating layer 25 and the middle shield layer 26 may be omitted.

The recording head 15 of the present embodiment is for use in perpendicular magnetic recording. The recording head 15 includes: a lower coil 31 disposed on the insulating layer 27; an insulating layer 32 covering the lower coil 31; a return magnetic pole layer 33 disposed on the insulating layer 32; and an insulating layer 34 disposed around the return magnetic pole layer 33 on the insulating layer 32. The recording head 15 further includes: a coupling layer 35 disposed on a part of the return magnetic pole layer 33 away from the medium facing surface 10a; an insulating layer 36 disposed around the coupling layer 35 on the return magnetic pole layer 33 and the insulating layer 34; an upper coil 37 disposed on the insulating layer 36; and an insulating layer 38 covering the upper coil 37. The top surface of the coupling layer 35 is exposed in the top surface of the insulating layer 38.

The recording head 15 further includes a yoke layer 39 disposed over the coupling layer 35 and the insulating layer 38; an insulating layer 40 disposed around the yoke layer 39 on the insulating layer 38; a magnetic pole 41 disposed on the yoke layer 39 and the insulating layer 40; and an insulating layer 42 disposed around the magnetic pole 41 on the yoke layer 39 and the insulating layer 40.

Each of the lower coil 31 and the upper coil 37 is made of a conductive material such as Cu. Each of the return magnetic pole layer 33, the coupling layer 35, the yoke layer 39 and the magnetic pole 41 is made of a soft magnetic material. Each of the insulating layers 32, 34, 36, 38, 40 and 42 is made of an insulating material such as alumina.

The lower coil 31 and the upper coil 37 are each planar spiral-shaped. The upper coil 37 is wound around the coupling layer 35. The inner end of the winding of the upper coil 37 is electrically connected to the inner end of the winding of the lower coil 31 through a not-shown connecting layer of columnar shape that penetrates through the insulating layers 36, 34 and 32. The lower coil 31 and the upper coil 37 are thereby connected in series. The lower coil 31 and the upper coil 37 are wound in the same direction of rotation from the outer end to the inner end. When an electric current is supplied to the lower coil 31 and the upper coil 37, the lower coil 31 and the upper coil 37 thus produce magnetic fields in opposite directions at their respective centers. The upper coil 37 produces a magnetic field corresponding to data to be recorded on the magnetic disk 201. The lower coil 31 produces a magnetic field that prevents the magnetic field produced by the upper coil 37 from affecting the reproducing head 14.

The recording head 15 further includes: a connecting layer 28 of columnar shape, with its bottom end electrically connected to the outer end of the lower coil 31; a wiring layer 29A having an end electrically connected to the top end of the connecting layer 28; a wiring layer 29B having an end electrically connected to the outer end of the upper coil 37; a connecting part 30A that electrically connects the other end of the wiring layer 29A to the terminal 53A; and a connecting part 30B that electrically connects the other end of the wiring layer 29B to the terminal 53B. The connecting layer 28, the wiring layers 29A and 29B, and the connecting parts 30A and 30B are each made of a conductive material such as Cu. Each of the connecting parts 30A and 30B is formed by stacking a plurality of conductor layers of columnar shape.

Each of the return magnetic pole layer 33 and the magnetic pole 41 has an end face located in the medium facing surface 10a. The yoke layer 39 has an end face that is closer to the medium facing surface 10a, and this end face is located at a distance from the medium facing surface 10a. The coupling layer 35 couples the return magnetic pole layer 33 and the yoke layer 39 to each other at a position away from the medium facing surface 10a. The return magnetic pole layer 33, the coupling layer 35, the yoke layer 39 and the magnetic pole 41 form a magnetic path for passing a magnetic flux corresponding to the magnetic field produced by the upper coil 37. The magnetic pole 41 produces a recording magnetic field for recording data on the magnetic disk 201 by means of the perpendicular magnetic recording system. The return magnetic pole layer 33 returns a magnetic flux that has been generated from the magnetic pole 41 and has magnetized the magnetic disk 201.

The recording head 15 further includes: an insulating layer 43 disposed over the magnetic pole 41 and the insulating layer 42; a near-field light generating element 44 disposed on the insulating layer 43; and an insulating layer 45 disposed around the near-field light generating element 44 on the insulating layer 43. The recording head 15 further includes: a buffer layer 46 disposed over the near-field light generating element 44 and the insulating layer 45; and a waveguide 47 disposed on the buffer layer 46.

The insulating layers 43 and 45 are each made of an insulating material such as alumina. The near-field light generating element 44 is made of a conductive material such as metal. For example, the near-field light generating element 44 may be made of one element selected from the group consisting of Pd, Pt, Rh, Ir, Ru, Au, Ag, Cu and Al, or an alloy composed of two or more of these elements.

The waveguide 47 is made of a dielectric material that transmits laser light emitted by the laser diode 60. The waveguide 47 has an outer surface. The outer surface includes an incident end face 47a, and an end face 47b that is closer to the medium facing surface 10a. While FIG. 10 shows an example in which the end face 47b is located at a distance from the medium facing surface 10a, the end face 47b may be located in the medium facing surface 10a.

Figure 11:
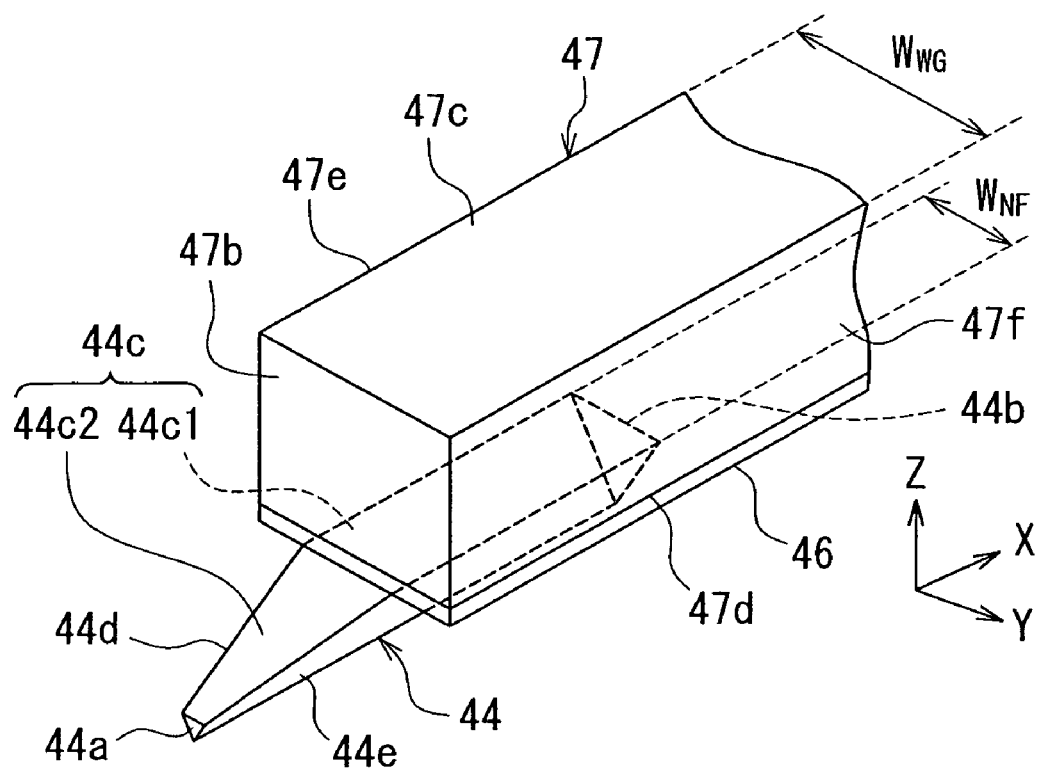
FIG. 11 is a perspective view showing the waveguide, the buffer layer and the near-field light generating element of the heat-assisted magnetic recording head according to the first embodiment of the invention.

FIG. 11 is a perspective view showing the waveguide 47, the buffer layer 46 and the near-field light generating element 44 in the vicinity of the end face 47b. As shown in FIG. 11, the outer surface of the waveguide 47 further includes a top surface 47c, a bottom surface 47d, and two side surfaces 47e and 47f. The bottom surface 47d is in contact with the top surface of the buffer layer 46.

The recording head 15 further includes the overcoat layer 50 mentioned previously. The overcoat layer 50 is disposed on the buffer layer 46 and covers the outer surface of the waveguide 47 excluding the incident end face 47a and the bottom surface 47d. Each of the buffer layer 46 and the overcoat layer 50 is made of a dielectric material and has a refractive index lower than that of the waveguide 47. Consequently, the waveguide 47 excluding the incident end face 47a is covered with the dielectric material that is lower in refractive index than the waveguide 47. The buffer layer 46 and the overcoat layer 50 may be made of the same material or different materials. The buffer layer 46 and the overcoat layer 50 also function as clad layers for the waveguide 47.

As shown in FIG. 5 and FIG. 6, the slider 10 includes a conductive layer 49 disposed on the top surface of the insulating layer 42 in the area where the laser diode 60 is to be disposed. The conductive layer 49 is made of a conductive material, such as a metal that contains Au as a main component. The conductive layer 49 constitutes at least a part of the first portion 10c1 of the top surface 10c of the slider 10. The laser diode 60 is disposed on the conductive layer 49. As shown in FIG. 5, the slider 10 further includes connecting layers 82 and 84 of columnar shape that electrically connect the conductive layer 49 to the terminal 54A. The connecting layer 82 is disposed on the conductive layer 49. The connecting layer 84 is disposed on the connecting layer 82. The terminal 54A is disposed on the connecting layer 84. The connecting layers 82 and 84 are made of Cu, for example.

Although not shown, the recording head 15 may further include a heater for heating the components of the recording head 15 including the magnetic pole 41 so as to control the distance between the magnetic recording medium 201 and the end face of the magnetic pole 41 located in the medium facing surface 10a. The heater is electrically connected to the terminals 52A and 52B.

Figure 7:
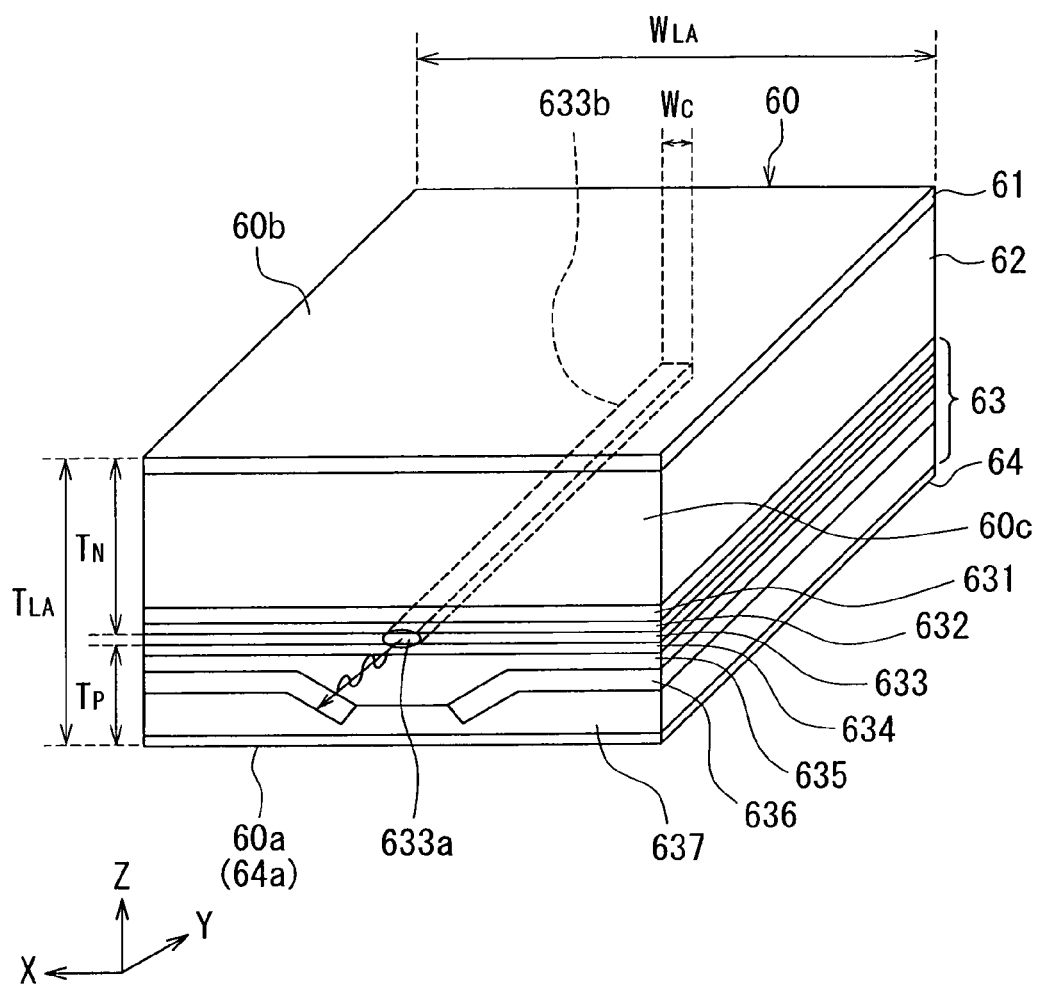
FIG. 7 is a perspective view showing the laser diode of the first embodiment of the invention.

An example of the configuration of the laser diode 60 will now be described with reference to FIG. 7. The laser diode 60 shown in FIG. 7 is rectangular-solid-shaped, having a bottom surface 60a, a top surface 60b, and four surfaces that connect the top and bottom surfaces 60a and 60b to each other. One of the four surfaces that connect the top and bottom surfaces 60a and 60b to each other is the emitting end face 60c.

The laser diode 60 includes: an n-substrate 62 having two surfaces that face toward mutually opposite directions; an n-electrode 61 bonded to one of the two surfaces of the n-substrate 62; a laser structure part 63 integrated on the other of the two surfaces of the n-substrate 62; and a p-electrode 64 bonded to the laser structure part 63 such that the laser structure part 63 is sandwiched between the p-electrode 64 and the n-substrate 62. The n-electrode 61 and the p-electrode 64 are each made of a conductive material, such as a metal that contains Au as a main component.

In the example shown in FIG. 7, the laser structure part 63 includes an n-clad layer 631, an n-guide layer 632, an active layer 633, a p-guide layer 634, a p-clad layer 635, an n-current blocking layer 636, and a p-contact layer 637 arranged in this order as viewed from the n-substrate 62. The laser structure part 63 also has a light propagation path (waveguide channel) 633b of stripe shape that includes a part of the active layer 633 and extends in a direction perpendicular to the emitting end face 60c. The active layer 633 has a surface that faces the n-guide layer 632 and a surface that faces the p-guide layer 634. The n-current blocking layer 636 has an opening of stripe shape that extends in one direction. The p-clad layer 635 makes contact with the p-contact layer 637 in this opening. With such a configuration, a current path of stripe shape extending in one direction is formed in the laser structure part 63. This consequently creates the light propagation path 633b in the laser structure part 63. In the direction parallel to the emitting end face 60c and the plane of the active layer 633 (the X direction in FIG. 7), the light propagation path 633b has a width We smaller than the width $W_{LA}$ of the laser diode 60. A laser diode having the light propagation path 633b of such stripe shape is referred to as a stripe laser. Various methods are available for forming the light propagation path 633b of stripe shape in the stripe laser, in addition to the foregoing method which uses the n-current blocking layer 636.

The emitting end face 60c lies at an end in the direction parallel to the plane of the active layer 633, or more specifically at one of ends in the direction in which the current path of stripe shape extends. The emitting end face 60c includes an emission part 633a that lies at an end of the light propagation path 633b and emits laser light. From the emission part 633a, the laser diode 60 emits polarized light of TM mode whose electric field oscillates in the direction perpendicular to the plane of the active layer 633. The laser diode 60 of the present embodiment may be any laser diode as long as it is an edge-emitting stripe laser and emits polarized light of TM mode, and may have any other configuration than that shown in FIG. 7.

The laser diode 60 is arranged so that the bottom surface 60a faces the first portion 10c1 of the top surface 10c of the slider 10. In particular, in the present embodiment, the laser diode 60 is arranged so that the p-electrode 64 faces the first portion 10c1 of the top surface 10c of the slider 10. Consequently, at least a part of the bottom surface 60a of the laser diode 60 is formed by the bottom (surface) 64a of the p-electrode 64, and at least a part of the top surface 60b of the laser diode 60 is formed by the top (surface) of the n-electrode 61. The bottom surface 60a and the top surface 60b lie at opposite ends in the direction perpendicular to the plane of the active layer 633. The distance $T_P$ between the bottom surface 60a and the active layer 633 is smaller than the distance $T_N$ between the top surface 60b and the active layer 633.

FIG. 7 shows the case where the entire bottom surface 60a is formed by the bottom surface 64a of the p-electrode 64, and the entire top surface 60b is formed by the top surface of the n-electrode 61. Nevertheless, the bottom surface 60a may be partly formed by the bottom surface 64a of the p-electrode 64, and the top surface 60b may be partly formed by the top surface of the n-electrode 61.

The first portion 10c1 and the second portion 10c2 of the top surface 10c of the slider 10 have a difference in level therebetween. The difference is necessary to align the position of the emission part 633a with that of the incident end face 47a of the waveguide 47 in the Z direction. The distance between the emission part 633a and the surface of the p-electrode 64 is smaller than the distance between the emission part 633a and the surface of the n-electrode 61. This makes it possible that, when the laser diode 60 is situated so that the p-electrode 64 faces the first portion 10c1 of the top surface 10c of the slider 10, the difference in level between the first portion 10c1 and the second portion 10c2 of the top surface 10c of the slider 10 is smaller as compared with the case where the laser diode 60 is situated so that the n-electrode 61 faces the first portion 10c1.

The laser diode 60 may be a laser diode of InP type, GaAs type, GaN type or the like that is commonly used for such applications as communications, optical disc storage and material analysis. The laser diode 60 may emit laser light of any wavelength within the range of, for example, 375 nm to 1.7 μm. Specifically, the laser diode 60 may be an InGaAsP/InP quarternary mixed crystal laser diode having an emittable wavelength range of 1.2 to 1.67 μm, for example. The laser diode 60 has a thickness $T_{LA}$ of around 60 to 200 μm, for example.

The conductive layer 49 is in contact with and electrically connected to the p-electrode 64. The p-electrode 64 is thereby electrically connected to the terminal 54A via the conductive layer 49. As shown in FIG. 4, the n-electrode 61 which forms the top surface 60b of the laser diode 60 is electrically connected to the terminal 54B with a bonding wire 68, for example. When a voltage for driving the laser diode 60 is applied to the terminals 54A and 54B, the voltage is supplied to the laser diode 60 via the conductive layer 49 and the bonding wire 68. Laser light is thereby emitted from the emission part 633a of the laser diode 60.

The laser diode 60 can be driven by a power supply inside the magnetic disk drive. The magnetic disk drive usually includes a power supply that generates a voltage of 2 V or so, for example. This supply voltage is sufficient to drive the laser diode 60. The laser diode 60 has a power consumption of, for example, several tens of milliwatts or so, which can be adequately covered by the power supply in the magnetic disk drive.

As shown in FIG. 3, the laser diode 60 is arranged so that the emitting end face 60c is parallel to the XZ plane and the laser light emitted from the emission part 633a travels in the −Y direction. The incident end face 47a of the waveguide 47 is opposed to the emission part 633a of the laser diode 60. The waveguide 47 has a curved shape so that the direction of travel of the laser light that has traveled in the −Y direction and entered the waveguide 47 from the incident end face 47a is turned to the −X direction.

As shown in FIG. 10, the overcoat layer 50 has an end face 50a that faces the emitting end face 60c of the laser diode 60. The emitting end face 60c of the laser diode 60 is positioned to leave a gap from the incident end face 47a of the waveguide 47 and the end face 50a of the overcoat layer 50.

While FIG. 5 shows the case where the incident end face 47a of the waveguide 47 is exposed to form a surface continuous to the end face 50a of the overcoat layer 50, the incident end face 47a may be thinly covered with a part of the overcoat layer 50.

Figure 1:
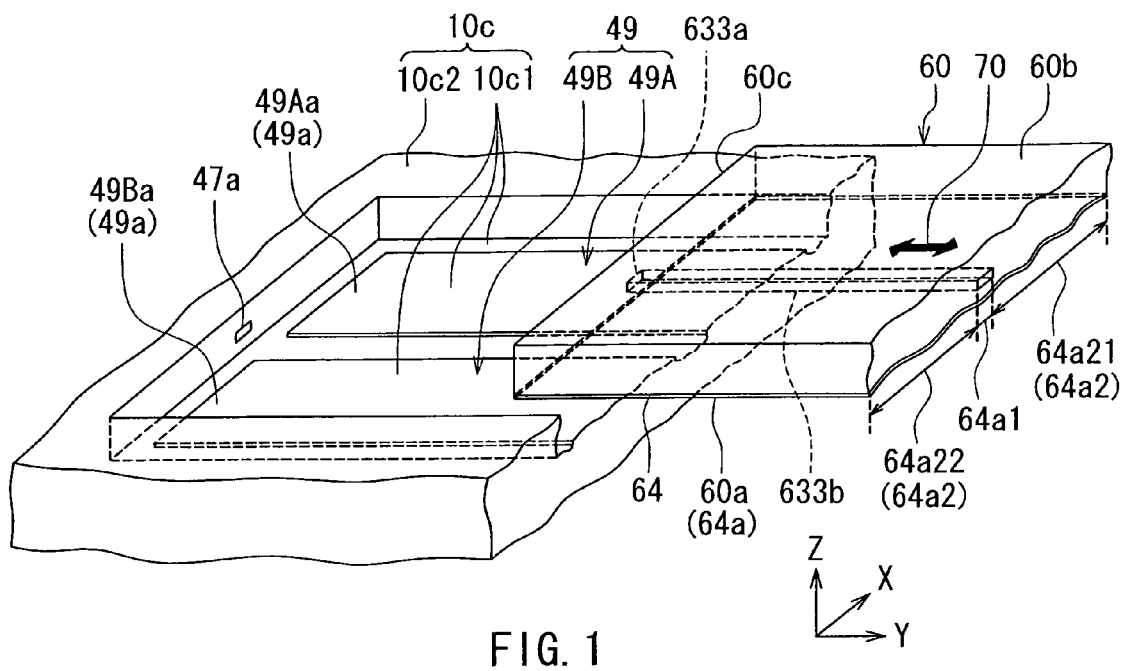
FIG. 1 is a perspective view showing a conductive layer of a slider and a laser diode in a heat-assisted magnetic recording head according to a first embodiment of the invention.

A description will now be given of the conductive layer 49 of the slider 10 and the p-electrode 64 of the laser diode 60 with reference to FIG. 1 and FIG. 6. FIG. 1 is a perspective view showing the conductive layer 49 of the slider 10 and the laser diode 60 in a state where the laser diode 60 is separated from the slider 10.

The p-electrode 64 of the laser diode 60 is bonded to the conductive layer 49 of the slider 10. As viewed from above the laser diode 60, the bottom surface 64a of the p-electrode 64 of the laser diode 60 includes a first area 64a1 that the light propagation path 633b overlies and a second area 64a2 other than the first area 64a1. The top surface 49a of the conductive layer 49 is in contact not with the first area 64a1 but with the second area 64a2 of the bottom surface 64a of the p-electrode 64.

In the present embodiment, in particular, the second area 64a2 includes two portions 64a21 and 64a22 that sandwich the first area 64a1 therebetween. The top surface 49a of the conductive layer 49 includes first and second contact surfaces 49Aa and 49Ba that make contact with the two portions 64a21 and 64a22 of the second area 64a2. The conductive layer 49 also has a first portion 49A that has the first contact surface 49Aa, and a second portion 49B that has the second contact surface 49Ba. As viewed from above the laser diode 60, the first and second portions 49A and 49B are separated from each other so as to sandwich the first area 64a1 therebetween. As shown in FIG. 5, the first portion 49A extends to a position under the terminal 54A. The connecting layer 82 is disposed on the first portion 49A.

Figure 12:
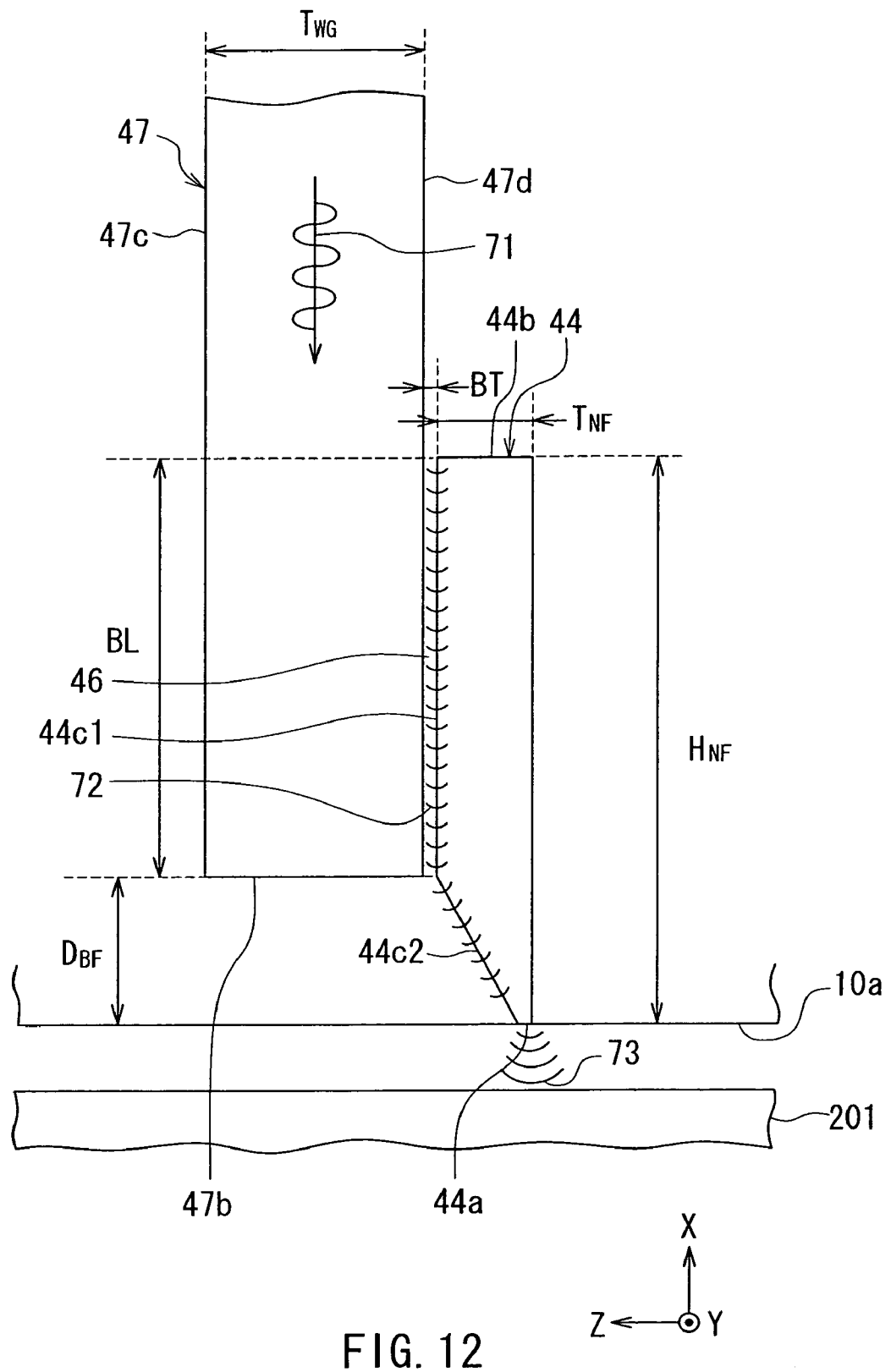
FIG. 12 is an explanatory diagram for explaining the principle of generation of near-field light by the heat-assisted magnetic recording head according to the first embodiment of the invention.

The relationship among the waveguide 47, the buffer layer 46 and the near-field light generating element 44 and the principle of generation of near-field light according to the present embodiment will now be described with reference to FIG. 11 and FIG. 12. FIG. 11 is a perspective view showing the waveguide 47, the buffer layer 46 and the near-field light generating element 44. FIG. 12 is an explanatory diagram for explaining the principle of generation of near-field light according to the present embodiment.

FIG. 11 shows an example of the shape of the near-field light generating element 44. The near-field light generating element 44 shown in FIG. 11 has a shape longer in the X direction. The outer surface of the near-field light generating element 44 includes: a first end face 44a that is located in the medium facing surface 10a; a second end face 44b that is farther from the medium facing surface 10a; and a connecting portion that connects the first end face 44a and the second end face 44b to each other. The connecting portion includes a top surface 44c, and two side surfaces 44d and 44e that decrease in distance from each other with decreasing distance to the top surface 11c of the substrate 11. The top surface 44c includes a coupling part 44c1 that extends from a midpoint between the first end face 44a and the second end face 44b to the second end face 44b, and a tapered part 44c2 that extends from the foregoing midpoint to the first end face 44a. The coupling part 44c1 is parallel to the XY plane. The tapered part 44c2 is inclined with respect to the XY plane such that the distance to the top surface 11c of the substrate 11 decreases toward the first end face 44a. Each of the first end face 44a and the second end face 44b is shaped like an isosceles triangle with its vertex downward. The first end face 44a has an area smaller than that of the second end face 44b. In the near-field light generating element 44 shown in FIG. 11, the first end face 44a constitutes a near-field light generating part that is located in the medium facing surface 10a and generates near-field light. The bottom surface 47d of the waveguide 47 is opposed to the coupling part 44c1 of the top surface 44c of the near-field light generating element 44 with the buffer layer 46 interposed therebetween.

The maximum width $W_{NF}$ (see FIG. 11) of the near-field light generating element 44 in the track width direction (Y direction) and the maximum thickness (dimension in the Z direction) $T_{NF}$ (see FIG. 12) of the near-field light generating element 44 are both sufficiently smaller than the wavelength of laser light 71 (see FIG. 12) that is emitted from the laser diode 60 and propagates through the waveguide 47. $W_{NF}$ falls within the range of 100 to 300 nm, for example. TNF falls within the range of 60 to 150 nm, for example. The near-field light generating element 44 has a length $H_{NF}$ (see FIG. 12) in the X direction of, for example, 0.5 to 3 µm.

In the vicinity of the near-field light generating element 44, the waveguide 47 has a width $W_{WG}$ (see FIG. 11) in the track width direction (Y direction) of, for example, 0.3 to 1 µm. In the vicinity of the near-field light generating element 44, the waveguide 47 has a thickness (dimension in the Z direction) $T_{WG}$ (see FIG. 12) of, for example, 0.1 to 1 µm. The distance $D_{BF}$ between the end face 47b of the waveguide 47 and the medium facing surface 10a falls within the range of 0 to 2.0 µm, for example.

As shown in FIG. 12, the distance between the bottom surface 47d of the waveguide 47 and the coupling part 44c1 of the near-field light generating element 44 that are opposed to each other with the buffer layer 46 therebetween will be denoted by the symbol BT. The distance BT falls within the range of 20 to 100 nm, for example. The length of the coupling part 44c1 will be denoted by BL. The length BL falls within the range of 0.5 to 3 µm, for example.

As described previously, each of the buffer layer 46 and the overcoat layer 50 has a refractive index lower than that of the waveguide 47. The buffer layer 46 and the overcoat layer 50 may be made of the same material or different materials. For example, if the wavelength of the laser light 71 is 600 nm and the waveguide 47 is made of $Al_2O_3$ (refractive index n=1.63), the buffer layer 46 and the overcoat layer 50 may be made of $SiO_2$ (refractive index n=1.46). If the waveguide 47 is made of tantalum oxide such as $Ta_2O_5$ (n=2.16), the buffer layer 46 and the overcoat layer 50 may be made of $SiO_2$ (n=1.46) or $Al_2O_3$ (n=1.63).

Reference is now made to FIG. 12 to describe the principle of generation of near-field light and the principle of heat-assisted magnetic recording using the near-field light. The laser light 71 emitted from the laser diode 60 propagates through the waveguide 47 to reach the vicinity of the buffer layer 46. The laser light 71 propagating through the waveguide 47 is TM-polarized light whose electric field oscillates in the direction perpendicular to the top surface 47c and the bottom surface 47d of the waveguide 47. Here, the laser light is totally reflected at the interface between the waveguide 47 and the buffer layer 46, and this generates evanescent light permeating into the buffer layer 46. Then, this evanescent light and fluctuations of charges on the coupling part 44c1 of the top surface 44c of the near-field light generating element 44 are coupled with each other to induce a surface plasmon polariton mode, whereby surface plasmons 72 are excited on the coupling part 44c1.

The surface plasmons 72 excited on the coupling part 44c1 propagate along the tapered part 44c2 of the top surface 44c of the near-field light generating element 44 to reach the near-field light generating part (the end face 44a). As a result, the surface plasmons 72 concentrate at the near-field light generating part (the end face 44a), and near-field light 73 thus occurs from the near-field light generating part (the end face 44a) based on the surface plasmons 72. The near-field light 73 is projected toward the magnetic disk 201, reaches the surface of the magnetic disk 201, and heats a part of the magnetic recording layer of the magnetic disk 201. This lowers the coercivity of the part of the magnetic recording layer. In heat-assisted magnetic recording, the part of the magnetic recording layer with the lowered coercivity is subjected to a recording magnetic field produced by the magnetic pole 41 for data recording.

The heat-assisted magnetic recording head 1 according to the present embodiment is capable of converting the laser light that propagates through the waveguide 47 into near-field light with higher light use efficiency, compared with the case where near-field light is generated from a plasmon antenna by directly irradiating the plasmon antenna with laser light. Consequently, according to the present embodiment, it is possible to prevent a part of the medium facing surface 10a from protruding due to conversion of the energy of the laser light into thermal energy in the heat-assisted magnetic recording head 1.

It should be noted that possible shapes of the near-field light generating element 44 are not limited to the one shown in FIG. 11. For example, the near-field light generating element 44 may be tetragonal-prism-shaped. In this case, the cross section of the near-field light generating element 44 parallel to the medium facing surface 10a may be rectangular, or may be trapezoidal such that the width decreases with decreasing distance to the top surface 11c of the substrate 11.

Figure 13:
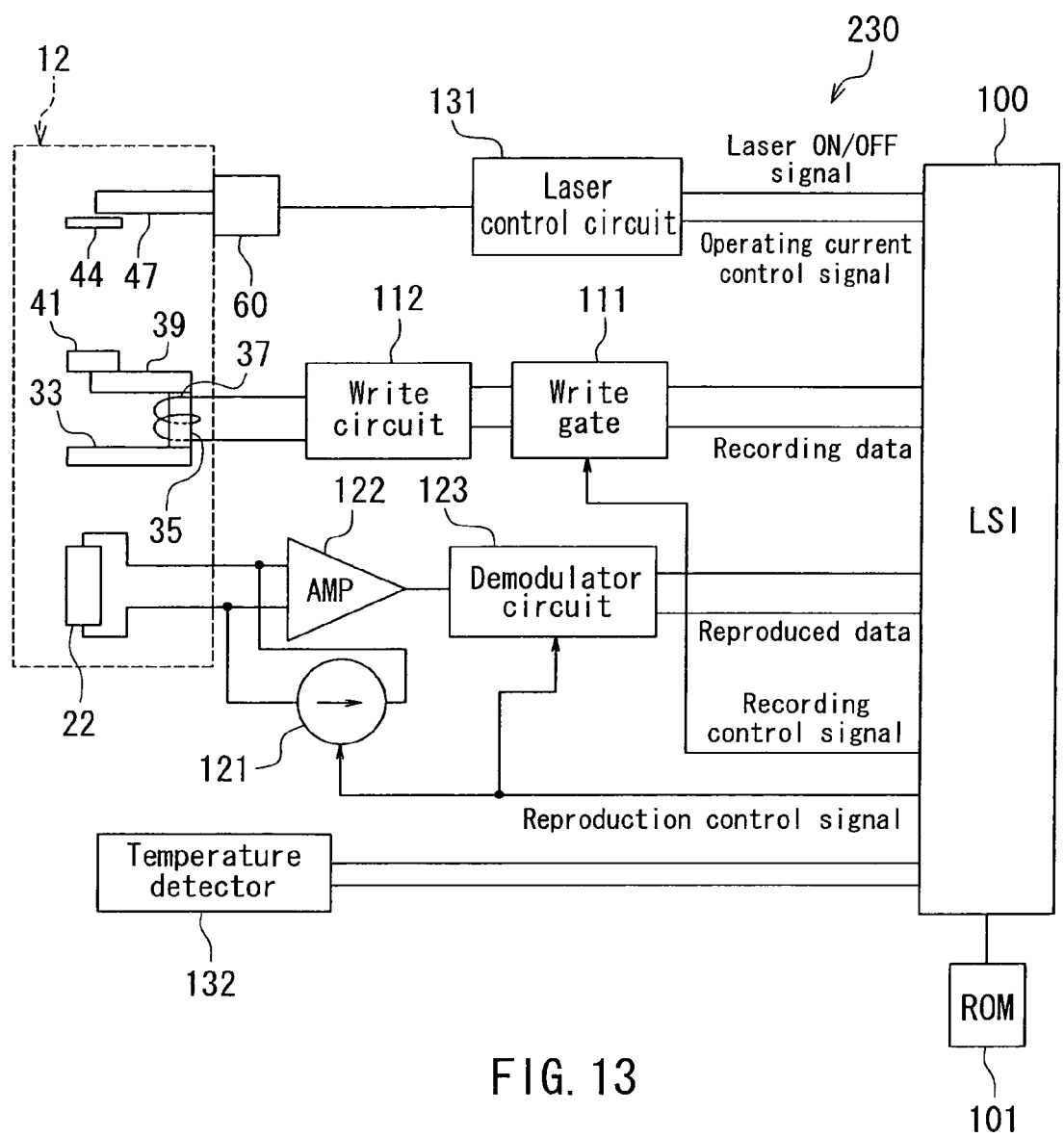
FIG. 13 is a block diagram showing the circuit configuration of the magnetic recording device according to the first embodiment of the invention.

Reference is now made to FIG. 13 to describe the circuit configuration of the control circuit 230 shown in FIG. 8 and the operation of the heat-assisted magnetic recording head 1. The control circuit 230 includes a control LSI (large scale integrated circuit) 100, a ROM (read only memory) 101 connected to the control LSI 100, a write gate 111 connected to the control LSI 100, and a write circuit 112 connected to the write gate 111 and the coil 37.

The control circuit 230 further includes a constant current circuit 121 connected to the MR element 22 and the control LSI 100, an amplifier 122 connected to the MR element 22, and a demodulator circuit 123 connected to an output of the amplifier 122 and the control LSI 100.

The control circuit 230 further includes a laser control circuit 131 connected to the laser diode 60 and the control LSI 100, and a temperature detector 132 connected to the control LSI 100.

The control LSI 100 supplies recording data and a recording control signal to the write gate 111. The control LSI 100 supplies a reproduction control signal to the constant current circuit 121 and the demodulator circuit 123, and receives reproduced data output from the demodulator circuit 123. The control LSI 100 supplies a laser ON/OFF signal and an operating current control signal to the laser control circuit 131. The temperature detector 132 detects the temperature of the magnetic recording layer of the magnetic disk 201, and supplies this temperature information to the control LSI 100. The ROM 101 contains a control table and the like for controlling the value of the operating current to be supplied to the laser diode 60.

In a recording operation, the control LSI 100 supplies recording data to the write gate 111. The write gate 111 supplies the recording data to the write circuit 112 only when the recording control signal indicates a recording operation. According to the recording data, the write circuit 112 passes a recording current through the coil 37. Consequently, the magnetic pole 41 produces a recording magnetic field and data is recorded on the magnetic recording layer of the magnetic disk 201 through the use of this recording magnetic field.

In a reproducing operation, the constant current circuit 121 supplies a certain sense current to the MR element 22 only when the reproduction control signal indicates a reproducing operation. The output voltage of the MR element 22 is amplified by the amplifier 122 and input to the demodulator circuit 123. When the reproduction control signal indicates a reproducing operation, the demodulator circuit 123 demodulates the output of the amplifier 122 to generate reproduced data, and supplies the reproduced data to the control LSI 100.

The laser control circuit 131 controls the supply of the operating current to the laser diode 60 on the basis of the laser ON/OFF signal, and also controls the value of the operating current to be supplied to the laser diode 60 on the basis of the operating current control signal. When the laser ON/OFF signal indicates an ON operation, the laser control circuit 131 exercises control so that an operating current at or above an oscillation threshold is supplied to the laser diode 60. Consequently, the laser diode 60 emits laser light, and the laser light propagates through the waveguide 47. According to the principle of generation of near-field light described above, the near-field light 73 occurs from the near-field light generating part (the end face 44a) of the near-field light generating element 44. The near-field light 73 heats a part of the magnetic recording layer of the magnetic disk 201, thereby lowering the coercivity of that part. When recording, the part of the magnetic recording layer with the lowered coercivity is subjected to the recording magnetic field produced by the magnetic pole 41 for data recording.

On the basis of such factors as the temperature of the magnetic recording layer of the magnetic disk 201 measured by the temperature detector 132, the control LSI 100 consults the control table stored in the ROM 101 to determine the value of the operating current for the laser diode 60. Using the operating current control signal, the control LSI 100 controls the laser control circuit 131 so that the operating current of that value is supplied to the laser diode 60. The control table contains, for example, data that indicates the oscillation threshold and the temperature dependence of the light output versus operating current characteristic of the laser diode 60. The control table may further contain data that indicates the relationship between the operating current value and a temperature increase of the magnetic recording layer heated by the near-field light 73, and data that indicates the temperature dependence of the coercivity of the magnetic recording layer.

As shown in FIG. 13, the control circuit 230 has the signal system for controlling the laser diode 60, i.e., the signal system consisting of the laser ON/OFF signal and the operating current control signal, independent of the control signal system intended for recording/reproducing operations. This configuration makes it possible to implement various modes of energization of the laser diode 60, not only to energize the laser diode 60 simply in association with a recording operation. It should be noted that possible circuit configurations of the control circuit 230 are not limited to the one shown in FIG. 13.

A description will now be given of a manufacturing method for the heat-assisted magnetic recording head 1 according to the present embodiment. The manufacturing method for the heat-assisted magnetic recording head 1 according to the present embodiment includes the step of fabricating the slider 10 and the step of fixing the laser diode 60 to the slider 10.

In the step of fabricating the slider 10, the slider 10 is completed by stacking the plurality of components of the head unit 12 on the top surface 11c of the substrate 11. Reference is now made to FIG. 14 to FIG. 24 to describe a method of forming the waveguide 47, the conductive layer 49 and the overcoat layer 50 and a method of installing the laser diode 60 of the present embodiment. FIG. 14 to FIG. 24 are cross-sectional views each showing a part of a stack of layers formed in the process of manufacturing the heat-assisted magnetic recording head 1. Each of FIG. 14 to FIG. 24 shows a cross section corresponding to FIG. 5.

Figure 14:
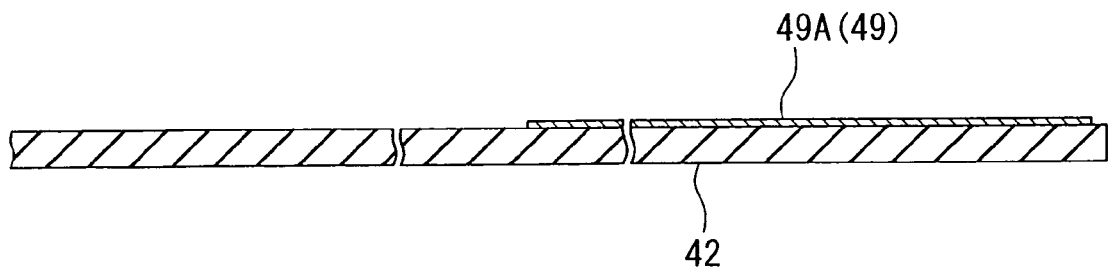
FIG. 14 is an explanatory diagram showing a step in the manufacturing process of the heat-assisted magnetic recording head according to the first embodiment of the invention.

FIG. 14 shows the step after the formation of the magnetic pole 41 and the insulating layer 42 in the process of manufacturing the heat-assisted magnetic recording head 1. In this step, the conductive layer 49 patterned is formed on the insulating layer 42. Of the conductive layer 49, only the first portion 49A is shown in FIG. 14 to FIG. 24.

Figure 15:
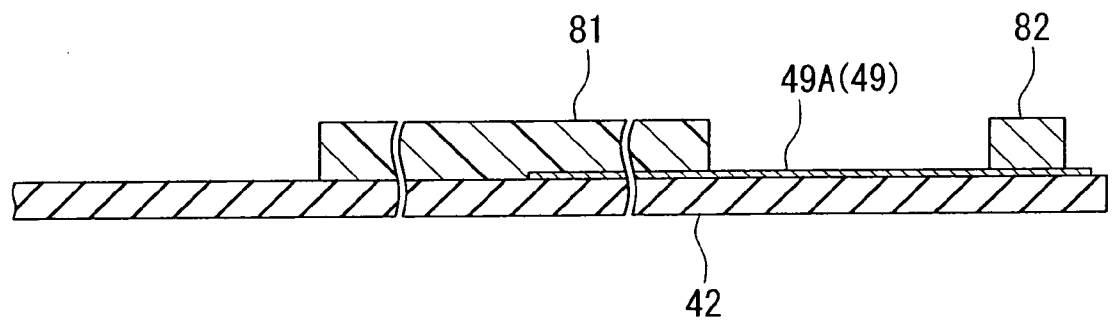
FIG. 15 is an explanatory diagram showing a step that follows the step of FIG. 14.

FIG. 15 shows the next step. This step forms a sacrificial layer 81 and the connecting layer 82 that are patterned. The sacrificial layer 81 is located in the area where to form the first portion 10c1 of the top surface 10c of the slider 10. The sacrificial layer 81 is made of alumina, $SiO_2$, or photoresist, for example.

Figure 16:
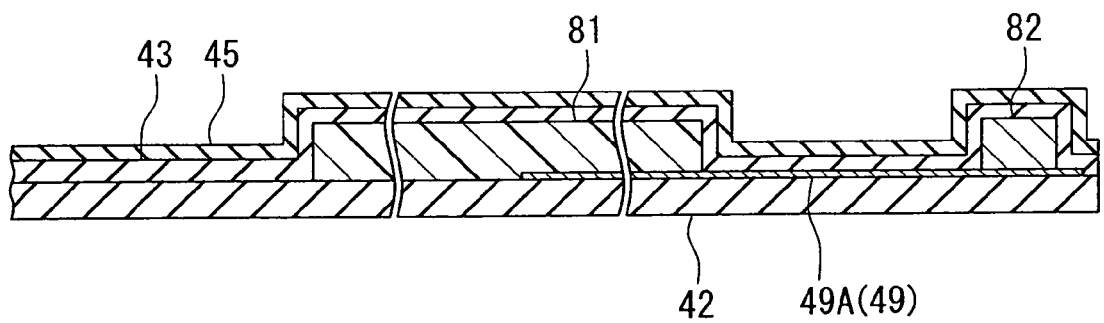
FIG. 16 is an explanatory diagram showing a step that follows the step of FIG. 15.

FIG. 16 shows the next step. In this step, first, the insulating layer 43 is formed over the entire top surface of the stack shown in FIG. 15. Next, the near-field light generating element 44 (not shown in FIG. 16) and the insulating layer 45 are formed on the insulating layer 43.

Figure 17:
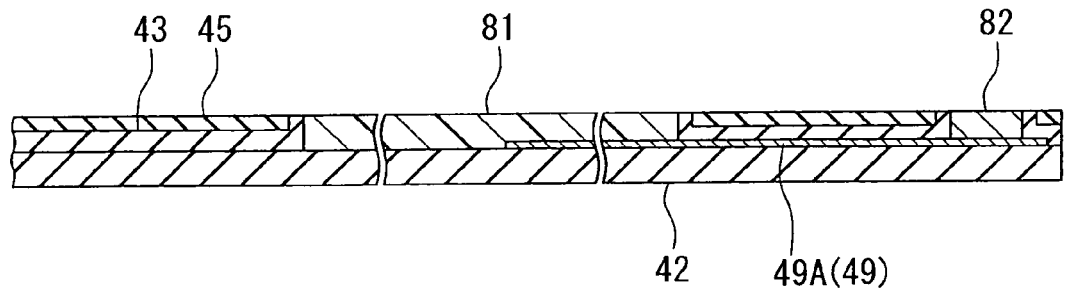
FIG. 17 is an explanatory diagram showing a step that follows the step of FIG. 16.

FIG. 17 shows the next step. In this step, chemical mechanical polishing (hereinafter, referred to as CMP), for example, is performed to polish and flatten the top surfaces of the insulating layer 43, the near-field light generating element 44 (not shown in FIG. 17), the insulating layer 45, the sacrificial layer 81, and the connecting layer 82. To create the near-field light generating element 44 that has the top surface 44c including the tapered part 44c2 as shown in FIG. 11, the layer to be made into the near-field light generating element 44 is flattened at the top by polishing, and then a part of the layer is taper-etched to form the tapered part 44c2.

Figure 18:
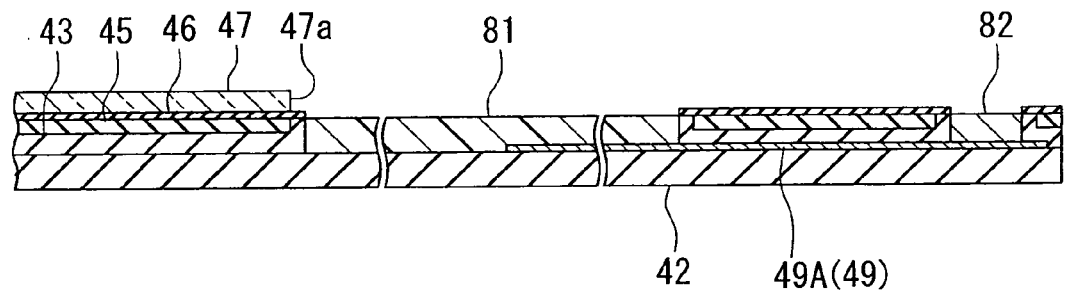
FIG. 18 is an explanatory diagram showing a step that follows the step of FIG. 17.

FIG. 18 shows the next step. In this step, first, the buffer layer 46 is formed on the top surface of the stack shown in FIG. 17, over the areas excluding the top surfaces of the sacrificial layer 81 and the connecting layer 82. Next, the waveguide 47 patterned is formed on the buffer layer 46.

Figure 19:
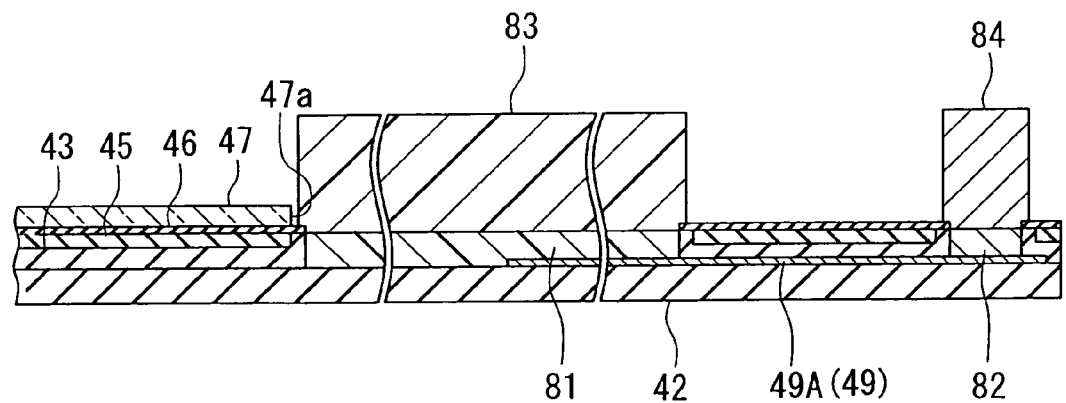
FIG. 19 is an explanatory diagram showing a step that follows the step of FIG. 18.

FIG. 19 shows the next step. In this step, a sacrificial layer 83 patterned is formed on the sacrificial layer 81, and the connecting layer 84 patterned is formed on the connecting layer 82. The sacrificial layer 83 is made of alumina, $SiO_2$, or photoresist, for example.

Figure 20:
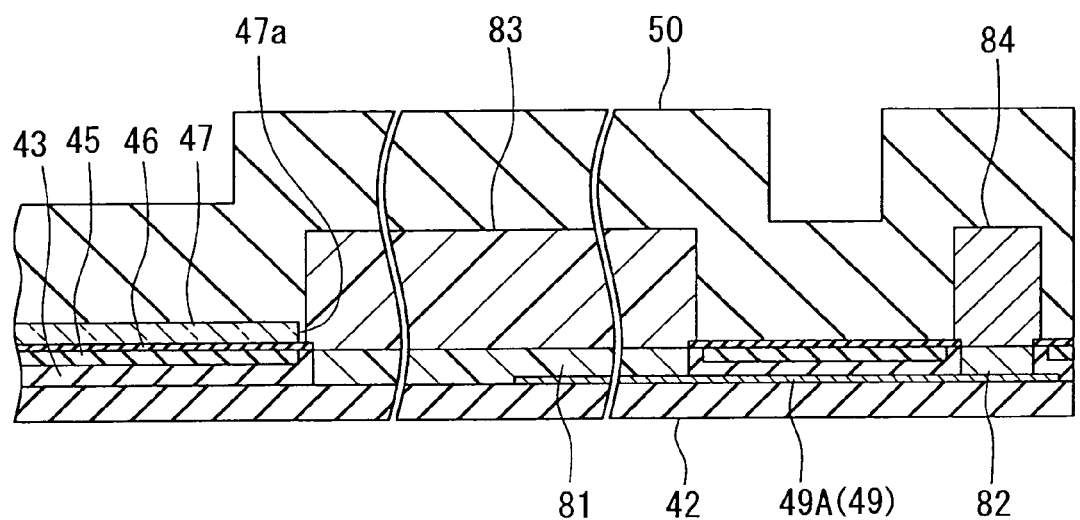
FIG. 20 is an explanatory diagram showing a step that follows the step of FIG. 19.
Figure 21:
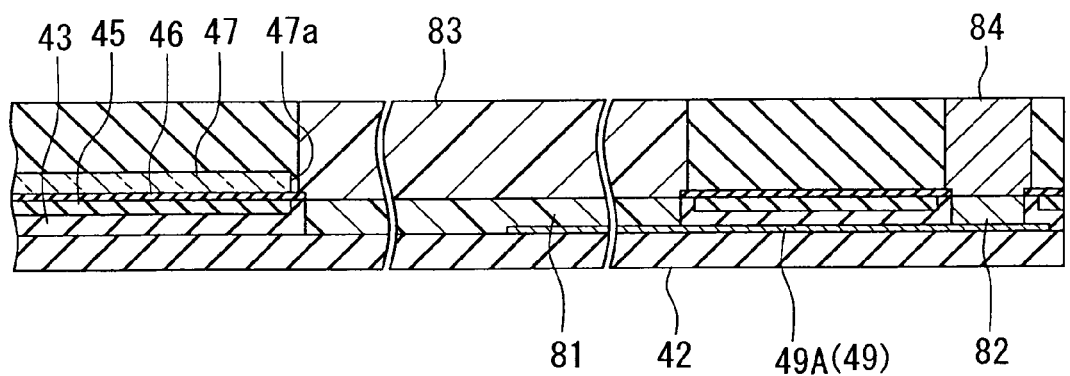
FIG. 21 is an explanatory diagram showing a step that follows the step of FIG. 20.

Next, as shown in FIG. 20, the overcoat layer 50 is formed over the entire top surface of the stack shown in FIG. 19. Next, as shown in FIG. 21, the overcoat layer 50 is polished by, for example, CMP, until the sacrificial layer 83 and the connecting layer 84 are exposed.

Figure 22:
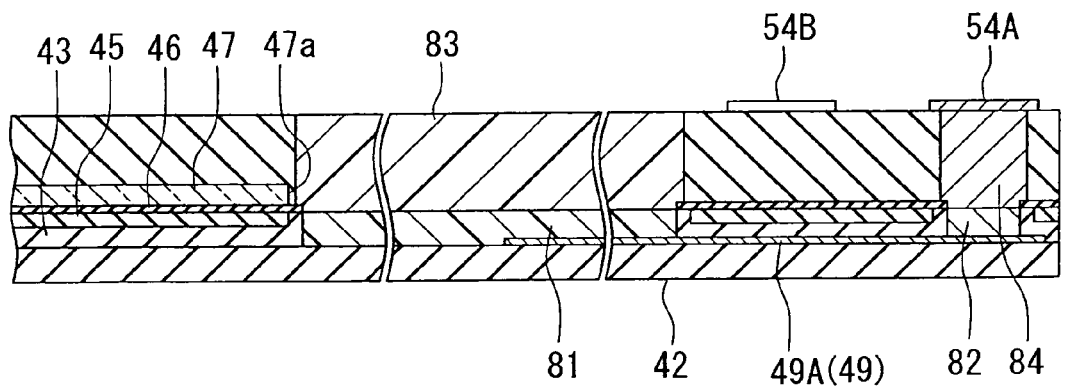
FIG. 22 is an explanatory diagram showing a step that follows the step of FIG. 21.
Figure 23:
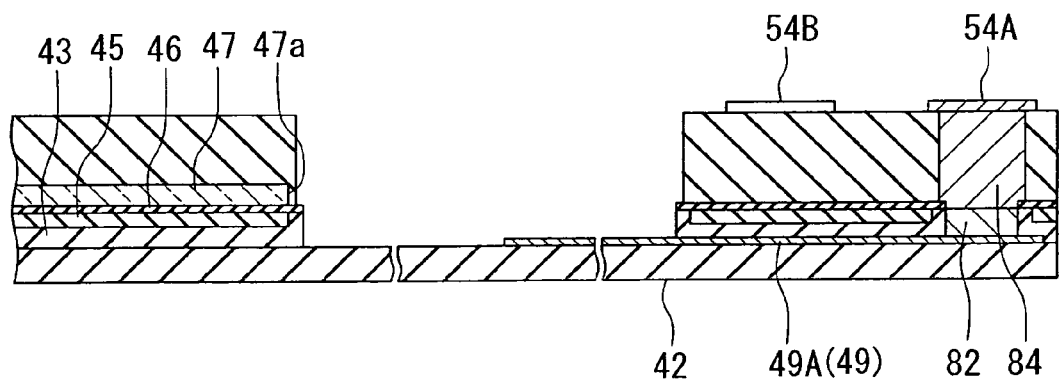
FIG. 23 is an explanatory diagram showing a step that follows the step of FIG. 22.

FIG. 22 shows the next step. In this step, the terminals 51A, 51B, 52A, 52B, 53A, 53B, 54A and 54B are formed on the overcoat layer 50. FIG. 22 shows the terminals 54A and 54B only. The terminal 54A is disposed on the connecting layer 84. Next, as shown in FIG. 23, the sacrificial layers 81 and 83 are removed by wet etching. The conductive layer 49 is thereby exposed.

Figure 24:
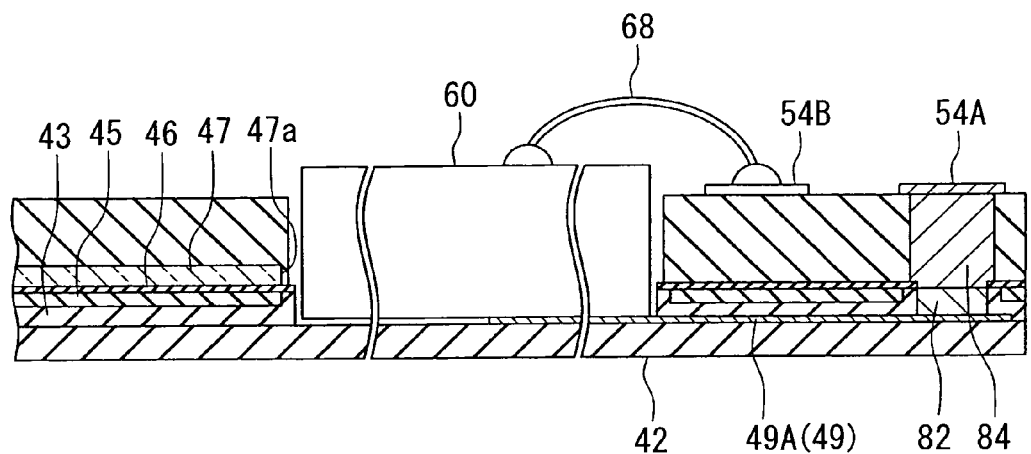
FIG. 24 is an explanatory diagram showing a step that follows the step of FIG. 23.

FIG. 24 shows the next step. In this step, first, the laser diode 60 is placed in the area where the sacrificial layers 81 and 83 have been removed. The laser diode 60 is then fixed to the slider 10. Specifically, the laser diode 60 is fixed to the slider 10 by bonding the p-electrode 64 of the laser diode 60 to the conductive layer 49. Next, the n-electrode 61 of the laser diode 60 is electrically connected to the terminal 54B with the bonding wire 68, for example.

Note that FIG. 24 shows the case where the incident end face 47a of the waveguide 47 is thinly covered with a part of the overcoat layer 50. This configuration can be achieved by forming the sacrificial layer 83 so as to leave a gap between the incident end face 47a of the waveguide 47 and the side surface of the sacrificial layer 83 as shown in FIG. 19. If the sacrificial layer 83 is formed so that its side surface is in contact with the incident end face 47a in the step shown in FIG. 19, then the incident end face 47a will be exposed to form a surface continuous to the end face 50a of the overcoat layer 50 as shown in FIG. 5.

Figure 2:
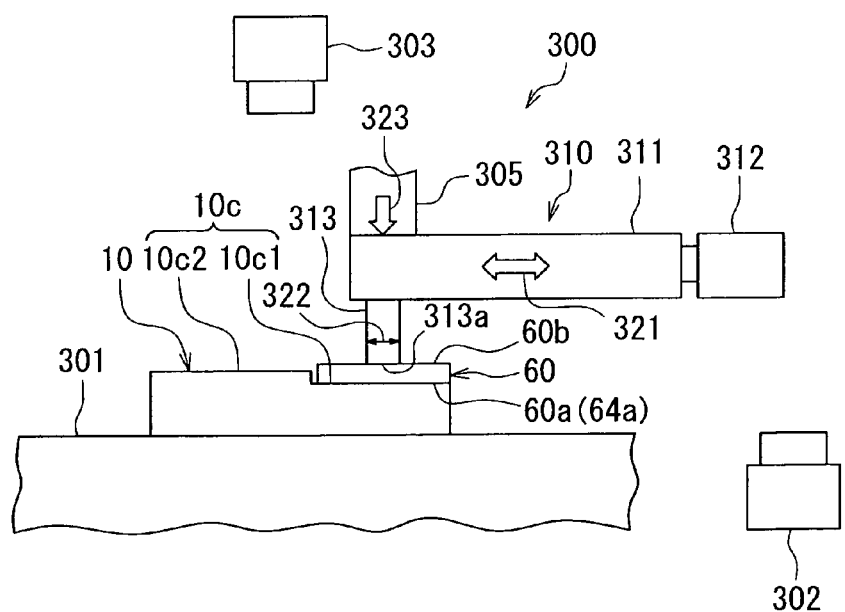
FIG. 2 is an explanatory diagram for explaining the step of fixing the laser diode to the slider in a manufacturing method for the heat-assisted magnetic recording head according to the first embodiment of the invention.

The step of fixing the laser diode 60 to the slider 10 will now be described in detail with reference to FIG. 1, FIG. 2, and FIG. 6. FIG. 2 is an explanatory diagram for explaining the step of fixing the laser diode 60 to the slider 10. In this step, the p-electrode 64 is bonded to the conductive layer 49 by ultrasonic bonding wherein ultrasonic vibrations are applied to the laser diode 60 in the direction perpendicular to the emitting end face 60c, with the second area 64a2 of the bottom surface 64a of the p-electrode 64 in contact with the top surface 49a of the conductive layer 49, as shown in FIG. 6. In FIG. 1, the arrow designated by the reference numeral 70 shows the direction of the ultrasonic vibrations to be applied to the laser diode 60. The ultrasonic bonding causes solid-phase diffusion between the conductive layer 49 and the p-electrode 64, whereby the conductive layer 49 and the p-electrode 64 are bonded to each other.

This step can be performed, for example, by using an ultrasonic bonding apparatus 300 shown in FIG. 2. The ultrasonic bonding apparatus 300 shown in FIG. 2 is a typical ultrasonic flip chip bonder that is used to flip-chip bond a chip to a substrate by ultrasonic bonding.

The ultrasonic bonding apparatus 300 includes a substrate stage 301, a bonding head 310, cameras 302 and 303, and a pressure device 305. The bonding head 310 is provided over the substrate stage 301 so as to be movable in horizontal and vertical directions.

The bonding head 310 includes an ultrasonic horn 311, an ultrasonic vibrator 312, and a bonding tool 313. The ultrasonic vibrator 312 is connected to an end of the ultrasonic horn 311. The bonding tool 313 is connected to the ultrasonic horn 311 in the vicinity of the other end of the ultrasonic horn 311 so as to protrude downward from the bottom of the ultrasonic horn 311. The bonding tool 313 has a suction surface 313a for sucking a component to be bonded. The bonding tool 313 is configured to be capable of holding the component to be bonded by sucking it to the suction surface 313a.

The ultrasonic horn 311 is driven by the ultrasonic vibrator 312 to generate ultrasonic vibrations in the direction of the arrow shown by the reference numeral 321. The bonding tool 313 is thus vibrated in the direction of the arrow shown by the reference numeral 322. The vibrations of the bonding tool 313 are applied to the component to be bonded.

The camera 302 is used to detect the position of the component to be bonded that is held by the bonding tool 313. The camera 303 is used to detect the position of the substrate that is placed on the substrate stage 301. The pressure device 305 applies pressure to the ultrasonic horn 311 and the bonding tool 313 downward.

To fix the laser diode 60 to the slider 10 by using the ultrasonic bonding apparatus 300 shown in FIG. 2, the slider 10 is initially placed on and fixed to the substrate stage 301 with the top surface 10c upward. Next, the laser diode 60 is held by the bonding tool 313 with the bottom surface 60a downward. The bonding tool 313 is then moved so that the laser diode 60 is located at a desired position on the first portion 10c1 of the top surface 10c of the slider 10. This brings the second area 64a2 of the bottom surface 64a of the p-electrode 64 into contact with the top surface 49a of the conductive layer 49 as shown in FIG. 6. The slider 10 and the laser diode 60 can be aligned based on the position information on the slider 10 and the laser diode 60 detected by using the cameras 302 and 303. With the second area 64a2 of the bottom surface 64a of the p-electrode 64 in contact with the top surface 49a of the conductive layer 49, the pressure device 305 then applies pressure to the ultrasonic horn 311 and the bonding tool 313 downward while the bonding tool 313 applies ultrasonic vibrations to the laser diode 60 in the direction perpendicular to the emitting end face 60c. The p-electrode 64 is thus bonded to the conductive layer 49 by ultrasonic bonding. Note that the ultrasonic bonding apparatus for use in fixing the laser diode 60 to the slider 10 may have any other configuration than that shown in FIG. 2.

As has been described, in the heat-assisted magnetic recording head 1 according to the present embodiment, the edge-emitting laser diode 60 is fixed to the slider 10 such that the bottom surface 60a lying at an end in the direction perpendicular to the plane of the active layer 633 faces the top surface 10c of the slider 10. This makes it possible to align the position of the emission part 633a with respect to the incident end face 47a of the waveguide 47 in the Z direction easily with high precision. Consequently, according to the present embodiment, it is easy to align the emission part 633a with respect to the incident end face 47a of the waveguide 47 while using the edge-emitting laser diode 60 which has a high optical output.

In the present embodiment, the laser diode 60 is arranged so that the p-electrode 64 faces the first portion 10c1 of the top surface 10c of the slider 10. This makes it possible to reduce the difference in level between the first portion 10c1 and the second portion 10c2 of the top surface 10c of the slider 10 as compared with the case where the laser diode 60 is arranged so that the n-electrode 61 faces the first portion 10c1, as mentioned previously. According to the present embodiment, the active layer 633, which generates heat when the laser diode 60 is in operation, can be located closer to the substrate 11 than in the case where the laser diode 60 is arranged so that the n-electrode 61 faces the first portion 10c1. This can promote heat dissipation from the laser diode 60.

With the laser diode 60 which emits polarized light of TM mode, the state of polarization of the emitted light changes sensitively in response to the stress that acts on the active layer 633, or the portion thereof constituting the light propagation path 633b in particular. In the present embodiment, as viewed from above the laser diode 60, the bottom surface 64a of the p-electrode 64 of the laser diode 60 includes the first area 64a1 that the light propagation path 633b of the laser diode 60 overlies and the second area 64a2 other than the first area 64a1. The top surface 49a of the conductive layer 49 is in contact not with the first area 64a1 but with the second area 64a2 of the bottom surface 64a of the p-electrode 64. According to the present embodiment, it is thus possible to prevent a stress resulting from the bonding between the p-electrode 64 and the conductive layer 49 from acting on the light propagation path 633b. Consequently, according to the present embodiment, it is possible to suppress changes in the state of polarization of the light emitted from the laser diode 60.

In the present embodiment, the p-electrode 64 is bonded to the conductive layer 49 by ultrasonic bonding in the step of fixing the laser diode 60 to the slider 10. In the ultrasonic bonding, ultrasonic vibrations are applied to the laser diode 60 in the direction perpendicular to the emitting end face 60c, with the second area 64a2 of the bottom surface 64a of the p-electrode 64 in contact with the top surface 49a of the conductive layer 49. According to the present embodiment, it is possible to reduce the stress occurring from the bonding between the p-electrode 64 and the conductive layer 49, as compared with the case where the p-electrode 64 is bonded to the conductive layer 49 by soldering. In this respect also, the present embodiment makes it possible to prevent a stress resulting from the bonding between the p-electrode 64 and the conductive layer 49 from acting on the light propagation path 633b, and thereby makes it possible to suppress changes in the state of polarization of the light emitted from the laser diode 60.

If the emission part 633a of the laser diode 60 is misaligned with respect to the incident end face 47a of the waveguide 47 in a direction parallel to the emitting end face 60c, the amount of laser light that enters the waveguide 47 decreases. This can cause a drop in the intensity of the laser light to be used for generating near-field light. In the present embodiment, ultrasonic vibrations are applied to the laser diode 60 in the direction perpendicular to the emitting end face 60c in the ultrasonic bonding. The present embodiment thus makes it possible to prevent the emission part 633a of the laser diode 60 from being misaligned with respect to the incident end face 47a of the waveguide 47 in a direction parallel to the emitting end face 60c during the ultrasonic bonding.

Consequently, according to the present embodiment, it is possible to prevent a drop in the intensity of the laser light to be used for generating near-field light. It should be noted that the application of ultrasonic vibrations to the laser diode 60 in the direction perpendicular to the emitting end face 60c may cause a misalignment of the emission part 633a with respect to the incident end face 47a of the waveguide 47 in the direction perpendicular to the emitting end face 60c. In such a case, however, there occurs hardly any change in the amount of the laser light that enters the waveguide 47.

[Second Embodiment]

Figure 25:
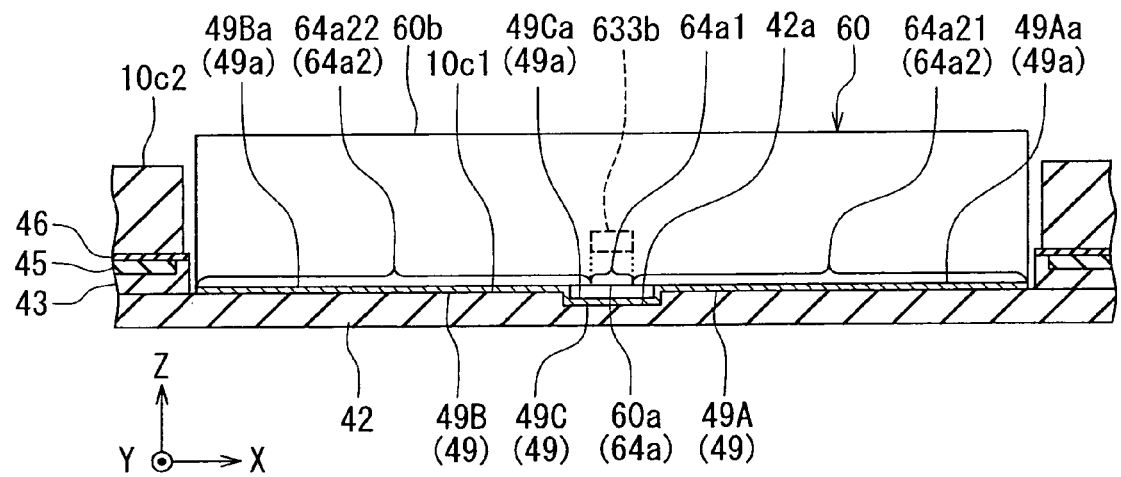
FIG. 25 is a cross-sectional view showing a part of a heat-assisted magnetic recording head according to a second embodiment of the invention.

A second embodiment of the present invention will now be described with reference to FIG. 25. FIG. 25 is a cross-sectional view showing a part of the heat-assisted magnetic recording head 1 according to the present embodiment. FIG. 25 shows a cross section taken at the same position as in FIG. 6.

In the present embodiment, the insulating layer 42 disposed under the conductive layer 49 has a recess 42a in its top surface. The recess 42a is opposed to the first area 64a1 of the bottom surface 64a of the p-electrode 64 of the laser diode 60. The conductive layer 49 of the present embodiment includes a third portion 49C that is recessed along the recess 42a so as not to make contact with the first area 64a1. In the present embodiment, the first portion 49A and the second portion 49B of the conductive layer 49 are connected by the third portion 49C, not being separated from each other. The top surface 49a of the conductive layer 49 includes first and second contact surfaces 49Aa and 49Ba that make contact with the two portions 64a21 and 64a22 of the second area 64a2, and a non-contact surface 49Ca that lies between the first and second contact surfaces 49Aa and 49Ba. The non-contact surface 49Ca is the top surface of the third portion 49C, and is not in contact with the bottom surface 64a of the p-electrode 64.

As compared with the step of fabricating the slider 10 of the first embodiment, the step of fabricating the slider 10 of the present embodiment includes an additional step of forming the recess 42a in the top surface of the insulating layer 42 by etching.

The remainder of configuration, function and effects of the present embodiment are similar to those of the first embodiment.

It should be appreciated that the present invention is not limited to the foregoing embodiments, and various modifications may be made thereto. For example, the foregoing embodiments have dealt with the cases where the waveguide 47, the buffer layer 46 and the near-field light generating element 44 are arranged so that the near-field light generating element 44 is opposed to the bottom surface of the waveguide 47 with the buffer layer 46 interposed therebetween in the vicinity of the medium facing surface 10a. The waveguide 47, the buffer layer 46 and the near-field light generating element 44, however, may be arranged so that the near-field light generating element 44 is opposed to the top surface of the waveguide 47 with the buffer layer 46 interposed therebetween in the vicinity of the medium facing surface 10a. In this case also, the laser light to propagate through the waveguide 47 needs to be TM-polarized.

In the foregoing embodiments, the end face 44a of the near-field light generating element 44 is located in the medium facing surface 10a at a position forward of the end face of the magnetic pole 41 along the Z direction (in other words, located closer to the trailing end). However, the end face 44a of the near-field light generating element 44 may be located backward of the end face of the magnetic pole 41 along the Z direction (in other words, located closer to the leading end) in the medium facing surface 10a.

It is apparent that the present invention can be carried out in various forms and modifications in the light of the foregoing descriptions. Accordingly, within the scope of the following claims and equivalents thereof, the present invention can be carried out in forms other than the foregoing most preferable embodiment.

What is claimed is:

1. A heat-assisted magnetic recording head comprising a slider, and an edge-emitting laser diode fixed to the slider,
the slider comprising:
a medium facing surface that faces a magnetic recording medium;
a magnetic pole that has an end face located in the medium facing surface and produces a recording magnetic field for recording data on the magnetic recording medium;
a waveguide that allows light to propagate therethrough;
a near-field light generating element that generates near-field light; and
a substrate on which the magnetic pole, the near-field light generating element and the waveguide are stacked,
wherein:
the substrate has a top surface facing toward the magnetic pole, the near-field light generating element and the waveguide;
the slider has a top surface that lies at an end above the top surface of the substrate;
the laser diode includes: an active layer; an emitting end face that lies at an end in a direction parallel to a plane of the active layer and includes an emission part for emitting laser light; a light propagation path that includes a part of the active layer and extends in a direction perpendicular to the emitting end face; a bottom surface and a top surface that lie at opposite ends in a direction perpendicular to the plane of the active layer; and an electrode having a bottom surface that constitutes at least a part of the bottom surface of the laser diode, the laser diode being arranged so that the bottom surface of the laser diode faces the top surface of the slider;
the light propagation path has a width smaller than that of the laser diode in a direction parallel to the emitting end face and the plane of the active layer;
a distance between the bottom surface of the laser diode and the active layer is smaller than that between the top surface of the laser diode and the active layer;
the laser light emitted from the emission part is polarized light of TM mode whose electric field oscillates in the direction perpendicular to the plane of the active layer;
the waveguide has an outer surface, the outer surface including an incident end face that is opposed to the emission part of the laser diode;

the near-field light generating element has a near-field light generating part that is located in the medium facing surface, and a coupling part that is opposed to the outer surface of the waveguide, a surface plasmon being excited on the coupling part based on the light propagating through the waveguide, the surface plasmon propagating to the near-field light generating part, the near-field light generating part generating near-field light based on the surface plasmon;

the slider further comprises a conductive layer having a top surface that constitutes a part of the top surface of the slider;

the electrode of the laser diode is bonded to the conductive layer of the slider;

as viewed from above the laser diode, the bottom surface of the electrode of the laser diode includes a first area that the light propagation path overlies, and a second area other than the first area; and the top surface of the conductive layer is in contact not with the first area but with the second area of the bottom surface of the electrode.

2. The heat-assisted magnetic recording head according to claim 1, wherein:

the second area includes two portions that sandwich the first area therebetween; and the top surface of the conductive layer includes a first contact surface and a second contact surface that make contact with the two portions of the second area.

3. The heat-assisted magnetic recording head according to claim 2, wherein the conductive layer has a first portion having the first contact surface and a second portion having the second contact surface, the first and second portions being separated from each other.

4. The heat-assisted magnetic recording head according to claim 2, wherein:

the slider includes an insulating layer disposed under the conductive layer;

the insulating layer has a top surface, the top surface of the insulating layer having a recess that is opposed to the first area of the bottom surface of the electrode; and the conductive layer includes a portion that is recessed along the recess of the top surface of the insulating layer so as not to make contact with the first area.

5. The heat-assisted magnetic recording head according to claim 1, wherein:

the slider further comprises a buffer layer that has a refractive index lower than that of the waveguide and is interposed between the coupling part and the outer surface of the waveguide; and a surface plasmon is excited on the coupling part through coupling with evanescent light that occurs from an interface between the waveguide and the buffer layer.

6. The heat-assisted magnetic recording head according to claim 1, wherein each of the electrode and the conductive layer is made of a metal that contains Au as a main component.

7. The heat-assisted magnetic recording head according to claim 1, wherein the emitting end face of the laser diode is positioned to leave a gap from the incident end face of the waveguide.

8. A manufacturing method for the heat-assisted magnetic recording head according to claim 1, comprising the steps of:

fabricating the slider; and fixing the laser diode to the slider, wherein in the step of fixing the laser diode to the slider, the electrode of the laser diode is bonded to the conductive layer of the slider by ultrasonic bonding wherein ultrasonic vibrations are applied to the laser diode in the direction perpendicular to the emitting end face, with the second area of the bottom surface of the electrode in contact with the top surface of the conductive layer.

9. The manufacturing method according to claim 8, wherein:

the second area includes two portions that sandwich the first area therebetween; and the top surface of the conductive layer includes a first contact surface and a second contact surface that make contact with the two portions of the second area.

10. The manufacturing method according to claim 9, wherein:

the conductive layer has a first portion having the first contact surface and a second portion having the second contact surface, the first and second portions being separated from each other.

11. The manufacturing method according to claim 9, wherein:

the slider includes an insulating layer disposed under the conductive layer;

the insulating layer has a top surface, the top surface of the insulating layer having a recess that is opposed to the first area of the bottom surface of the electrode; and the conductive layer includes a portion that is recessed along the recess of the top surface of the insulating layer so as not to make contact with the first area.

12. The manufacturing method according to claim 8, wherein:

the slider further comprises a buffer layer that has a refractive index lower than that of the waveguide and is interposed between the coupling part and the outer surface of the waveguide; and a surface plasmon is excited on the coupling part through coupling with evanescent light that occurs from an interface between the waveguide and the buffer layer.

13. The manufacturing method according to claim 8, wherein each of the electrode and the conductive layer is made of a metal that contains Au as a main component.

14. The manufacturing method according to claim 8, wherein the emitting end face of the laser diode is positioned to leave a gap from the incident end face of the waveguide.

15. A head gimbal assembly comprising: the heat-assisted magnetic recording head according to claim 1; and a suspension that supports the heat-assisted magnetic recording head.

16. A magnetic recording device comprising: a magnetic recording medium; the heat-assisted magnetic recording head according to claim 1; and a positioning device that supports the heat-assisted magnetic recording head and positions the heat-assisted magnetic recording head with respect to the magnetic recording medium.

* * * * *